US012577106B1

(12) United States Patent　　　　(10) Patent No.:　US 12,577,106 B1
Kumar et al.　　　　　　　　　　　 (45) Date of Patent:　　Mar. 17, 2026

(54) BORON NITRIDE/BORON NITRIDE NANOTUBE COMPOSITE FIBERS AND METHODS OF MAKING AND USE THEREOF

(71) Applicant: Georgia Tech Research Corporation, Atlanta, GA (US)

(72) Inventors: Satish Kumar, Atlanta, GA (US); Keenan Mintz, Atlanta, GA (US); Kishor Kumar Gupta, Atlanta, GA (US); Casey Smith, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 172 days.

(21) Appl. No.: 18/487,356

(22) Filed: Oct. 16, 2023

Related U.S. Application Data

(60) Provisional application No. 63/379,820, filed on Oct. 17, 2022.

(51) Int. Cl.
　　*C01B 21/064*　　(2006.01)
　　*B82Y 30/00*　　(2011.01)
　　*B82Y 40/00*　　(2011.01)

(52) U.S. Cl.
　　CPC ........... *C01B 21/0648* (2013.01); *B82Y 30/00* (2013.01); *B82Y 40/00* (2013.01); *C01P 2004/03* (2013.01); *C01P 2004/16* (2013.01)

(58) Field of Classification Search
　　CPC ..... C01B 21/0648; B82Y 30/00; B82Y 40/00; C01P 2004/16; D01F 9/08; D01F 9/10; D01F 9/12–328; D01F 11/04–08; D01F 11/124; C04B 35/62227–62295
　　See application file for complete search history.

(56) References Cited

U.S. PATENT DOCUMENTS

| | | | |
|---|---|---|---|
| 3,620,780 A | | 11/1971 | Economy et al. |
| 4,931,100 A | * | 6/1990 | Johnson ............ C04B 35/62277 |
| | | | 524/45 |
| 5,547,623 A | * | 8/1996 | Barnard ............ C04B 35/62281 |
| | | | 428/113 |
| 5,783,139 A | * | 7/1998 | Curran .................... C04B 35/56 |
| | | | 419/10 |
| 9,862,604 B2 | | 1/2018 | Kim et al. |
| 11,898,271 B1 | * | 2/2024 | Estevez .................. D06M 11/58 |
| 2004/0044162 A1 | * | 3/2004 | Miele ...................... C08G 79/08 |
| | | | 528/7 |
| 2005/0180206 A1 | * | 8/2005 | Randell ............... G06F 13/1694 |
| | | | 365/185.01 |
| 2009/0286079 A1 | * | 11/2009 | Barker ...................... D01F 1/10 |
| | | | 524/495 |
| 2011/0192319 A1 | * | 8/2011 | Park .......................... C08K 7/24 |
| | | | 528/346 |
| 2015/0376069 A1 | * | 12/2015 | Kang ................... H10N 30/853 |
| | | | 501/154 |
| 2017/0275742 A1 | * | 9/2017 | Ganor ....................... B22F 3/16 |

OTHER PUBLICATIONS

Arenal R et al., Young modulus, mechanical and electrical properties of isolated individual and bundled single-walled boron nitride nanotubes, Nanotechnology, 2011, 22(26), 265704.

Belkerk BE et al., Thermal Conductivity of vertically aligned boron nitride nanotubes, Applied Physics Express, 2016, 9(7), 075002.

Bernard S et al. Chemical tailoring of Single-Source molecular and polymeric precursors for the preparation of ceramic fibers. Journal of Optoelectronics and Advanced Materials 2006, 8 (2), 648.

Chang H et al. Structural and functional fibers, Annu Rev Mater Res, 2017, 47, 331-59.

Cornu D et al. Alkylaminoborazine-based precursors for the preparation of boron nitride fibers by the polymer-derived ceramics (PDCs) route. Journal of the European Ceramic Society 2005, 25 (2-3), 111-121.

Deng C et al. Preparation and Characterisation of Polyborazine as Novel Precursor to Boron Nitride Ceramic, Advanced Materials Research, 2011, 194-196, 1749-1754.

Du Y et al. Design and synthesis of a novel spinnable polyborazine precursor with high ceramic yield via one-pot copolymerization, Journal of the American Ceramic Society, 2021, 104(11), 5509-5520.

Du Y et al. Nearly stoichiometric BN fiber with high crystallinity achieved by boron trichloride assisted curing process, Journal of the American Ceramic Society, 2022, 105(1), 82-89.

Ihsanullah I. "Boron nitride-based materials for water purification: Progress and outlook," Chemosphere, 2021, 263, 127970.

Kim KS et al., "Hydrogen-Catalyzed, Pilot-Scale Production of Small-Diameter Boron Nitride Nanotubes and Their Macroscopic Assemblies," ACS Nano, 2014, 8(6), 6211-6220.

Kimura Y et al. High-performance boron-nitride fibers from poly(borazine) preceramics, Composites Science and Technology, 1994, 51(2), 173-179.

(Continued)

*Primary Examiner* — Jeffrey M Wollschlager

(74) *Attorney, Agent, or Firm* — Meunier Carlin & Curfman LLC

(57) ABSTRACT

Disclosed herein are boron nitride/boron nitride nanotube composite fibers and methods of making and use thereof. For example, disclosed herein are methods of making a boron nitride/boron nitride nanotube composite fiber by spinning a mixture comprising a plurality of boron nitride nanotubes, a polymeric boron nitride precursor, a polymer, and a solvent to form precursor fibers having a first average outer diameter. The methods further comprise drawing the precursor fibers to form drawn fibers having a second average outer diameter that is less than the first average outer diameter. The methods further comprise heating the drawn fibers while the drawn fibers are under tension to substantially remove the polymer and to substantially convert the polymeric boron nitride precursor to boron nitride, thereby forming the composite fiber. Also disclosed herein are composite fibers made by any of the methods disclosed herein.

19 Claims, 15 Drawing Sheets

(56) References Cited

OTHER PUBLICATIONS

Lei Y et al. Nearly stoichiometric BN fiber by curing and thermolysis of a novel poly[(alkylamino)borazine], Ceramics International, 2011, 37(6), 1795-1800.

Li X et al. Synthesis of Continuous Boron Nitride Nanofibers by Electrospinning, Physics Proceedia, 2012, 25, 185-188.

Miele P et al. Borylborazines as new precursors for boron nitride fibres, Journal of Organometallic Chemistry, 2005, 690(11), 2809-2814.

De Moraes ACM et al. "Phase-Inversion Polymer Composite Separators Based on Hexagonal Boron Nitride Nanosheets for High-Temperature Lithium-Ion Batteries," ACS Appl. Mater. Interfaces, 2020, 12, 8107-8114.

Qiu Y et al. "Large-scale production of aligned long boron nitride nanofibers by multijet/multicollector electrospinning," Journal of Physical Chemistry C, 2009, 113(26), 11228-11234.

Qiu Y et al. Synthesis of continuous boron nitride nanofibers by solution coating electrospun template fibers. Nanotechnology 2009, 20 (34), 345603.

Salles V et al. A new class of boron nitride fibers with tunable properties by combining an electrospinning process and the polymer-derived ceramics route, Nanoscale, 2010, 2, 215-217.

Simonsen Ginestra CJ et al., "Liquid crystals of neat boron nitride nanotubes and their assembly into ordered macroscopic materials," Nature Communications 2022 13:1, vol. 13, No. 1, pp. 1-8, Jun. 2022, doi: 10.1038/s41467-022-30378-5.

Toutois P et al. "Structural and Mechanical Behavior of Boron Nitride Fibers Derived from Poly[(Methylamino)Borazine] Precursors: Optimization of the Curing and Pyrolysis Procedures", Journal of the American Ceramic Society, 2006, 89 (1), 42-49.

Wang C et al. Structural evaluation and mechanical property of boron nitride fibers during melt-drawn fabrication process, International Journal of Applied Ceramic Technology, 2018, 15(3), 660-667.

"Transforming Composite Materials with Boron Nitride NanoBarbs" https://www.azonano.com/article.aspx?ArticleID=5600, accessed on Nov. 9, 2023.

* cited by examiner

BORON NITRIDE/BORON NITRIDE NANOTUBE COMPOSITE FIBERS AND METHODS OF MAKING AND USE THEREOF

CROSS-REFERENCE TO RELATED APPLICATIONS

This application claims the benefit of priority to U.S. Provisional Application No. 63/379,820 filed Oct. 17, 2022, which is hereby incorporated herein by reference in its entirety.

STATEMENT OF GOVERNMENT SUPPORT

This invention was made with government support under contract number HR001121C0048 awarded by the Department of Defense. The government has certain rights in the invention.

BACKGROUND

Previous fibers made from boron nitride nanotubes lack sufficient strength and/or modulus to offer utility as structural reinforcements. Fibers with improved properties and improved methods of making said fibers are needed. The compositions and methods discussed herein addresses these and other needs.

SUMMARY

In accordance with the purposes of the disclosed compositions and methods, as embodied and broadly described herein, the disclosed subject matter relates to boron nitride/boron nitride nanotube composite fibers and methods of making and use thereof.

For example, disclosed herein are methods of making a boron nitride/boron nitride nanotube composite fiber (e.g., a composite fiber comprising boron nitride and boron nitride nanotubes). In some examples, the method comprise spinning a mixture comprising a plurality of boron nitride nanotubes, a polymeric boron nitride precursor, a polymer, and a solvent to form precursor fibers comprising the plurality of boron nitride nanotubes, the polymeric boron nitride precursor, and the polymer, wherein the precursor fibers have a first average outer diameter. The methods further comprise drawing the precursor fibers to form drawn fibers, wherein the drawn fibers have a second average outer diameter, the second average outer diameter being less than the first average outer diameter. The methods further comprise heating the drawn fibers while the drawn fibers are under tension to substantially remove the polymer and to substantially convert the polymeric boron nitride precursor to boron nitride, thereby forming the composite fiber.

In some examples, the methods further comprise forming the mixture. In some examples, the methods further comprise forming the mixture by forming a first dispersion by dispersing the plurality of boron nitride nanotubes in a first solvent; forming a second dispersion by dispersing the polymeric boron nitride precursor in a second solvent; contacting the second dispersion with the polymer to form a third dispersion; and contacting the first dispersion with the third dispersion.

In some examples, the first dispersion comprises the plurality of boron nitride nanotubes at a concentration of from 0.01 grams to 5 grams boron nitride nanotubes per 100 milliliters of solvent.

In some examples, the methods further comprise agitating the first dispersion before contacting the first dispersion with the third dispersion.

In some examples, the second dispersion comprises the polymeric boron nitride precursor at a concentration of from 0.1 grams to 25 grams of polymeric boron nitride precursor per 100 milliliters of solvent.

In some examples, the methods further comprise agitating the second dispersion before contacting the second dispersion with the polymer.

In some examples, the first solvent and the second solvent are the same.

In some examples, the polymer comprises a polyacrylonitrile (co) polymer, a poly(methyl (meth) acrylate) (co) polymer, a polyvinyl alcohol (co) polymer, or a combination thereof.

In some examples, the methods further comprise agitating the mixture before spinning the mixture. In some examples, the mixture is agitated for a first amount of time at a first temperature, the first amount of time being from 1 minute to 72 hours and/or the first temperature being 30° C. or less. In some examples, after the first amount of time, the method further comprises heating the mixture at a second temperature for a second amount of time, the second temperature being 50° C. or more and/or the second amount of time being from 1 second to 72 hours. In some examples, the method further comprises ceasing agitation for at least a portion of the second amount of time.

In some examples, the plurality of boron nitride nanotubes has an average outer diameter of from 1 nanometer (nm) to 100 nm.

In some examples, the plurality of boron nitride nanotubes has an average length of from 100 nm to 10 millimeters (mm).

In some examples, the plurality of boron nitride nanotubes has an average aspect ratio of from greater than 1 to $1 \times 10^7$.

In some examples, the polymeric boron nitride precursor comprises a borazine compound, such as a borazine-based compound.

In some examples, spinning the mixture comprises electrospinning, wet jet fiber pulling, wet spinning, dry spinning, dry-jet wet spinning, or combinations thereof. In some examples, spinning the mixture comprises dry-jet wet spinning.

In some examples, the precursor fibers are spun into a coagulation bath, the coagulation bath comprising a coagulation solvent. In some examples, the coagulation solvent comprises methanol. In some examples, the coagulation solvent comprises toluene, dimethylacetamide (DMAc), or a combination thereof.

In some examples, the mixture is spun using a spinneret having a diameter of 500 μm or less.

In some examples, the first average outer diameter of the precursor fiber is from 100 nm to 500 μm.

In some examples, the precursor fiber comprises from 1 to 50 wt. % of the plurality of boron nitride nanotubes relative to the total weight of the polymer. In some examples, the precursor fiber comprises from 1 to 80 wt. % of the polymeric boron nitride precursor relative to the total weight of the polymer.

In some examples, the precursor fibers are drawn in an inert environment.

In some examples, the precursor fibers are drawn at a temperature of 20° C. or more. In some examples, the precursor fibers are drawn at a temperature of 100° C. or more.

In some examples, the second average outer diameter of the drawn fiber is from 100 nm to 100 μm.

In some examples, the drawn fibers are heated in a tube or box furnace.

In some examples, the drawn fibers are heated in an atmosphere comprising nitrogen, ammonia, helium, argon, or a combination thereof.

In some examples, the tension applied to the drawn fibers during heating is from greater than 0 to 100 MPa. In some examples, the tension applied to the drawn fibers during heating is from greater than 0 MPa to 50 MPa.

In some examples, the drawn fibers are heated at a temperature from 20° C. to 1500° C. In some examples, the drawn fibers are heated at a temperature of from 20° C. to 1000° C., from 20° C. to 1100° C., or from 100° C. to 1100° C.

In some examples, the drawn fibers are heated at a heating rate of from 0.1° C./minute to 3.0° C./minute.

In some examples, the composite fiber has an average outer diameter of from 100 nm to 50 μm.

In some examples, the composite fiber has a modulus of from 5 GPa to 500 GPa. In some examples, the composite fiber has a modulus of 5 GPa or more, 50 GPa or more, or 100 GPa or more.

In some examples, the composite fiber has a tensile strength of from 25 MPa to 5 GPa. In some examples, the composite fiber has a tensile strength of 25 MPa or more, 50 MPa or more, 100 MPa or more, 200 MPa or more, or 330 MPa or more.

In some examples, the composite fiber has a high thermal conductivity, high temperature oxidative resistance, low electrical conductivity, or a combination thereof.

In some examples, the methods further comprise heat treating the composite fiber. In some examples, heat treating the composite fiber comprises heating the composite fiber at a temperature of from 1500° C. to 2200° C. or from 1800° C. to 2200° C. in an inert environment. In some examples, heat treating the composite fiber comprises heating the composite fiber at a temperature of from 1500° C. to 2000° C. or from 1800° C. to 2000° C. in an inert environment. Also disclosed herein are composite fibers made by any of the methods disclosed herein.

Additional advantages of the disclosed compositions and methods will be set forth in part in the description which follows, and in part will be obvious from the description. The advantages of the disclosed compositions and methods will be realized and attained by means of the elements and combinations particularly pointed out in the appended claims. It is to be understood that both the foregoing general description and the following detailed description are exemplary and explanatory only and are not restrictive of the disclosed devices and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
FIG. 1. Photograph of a drawn precursor fiber.

The compositions and methods described herein may be understood more readily by reference to the following detailed description of specific aspects of the disclosed subject matter and the Examples included therein.

Before the present compositions and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB.

Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

"Polymer" means a material formed by polymerizing one or more monomers.

The term "(co) polymer" includes homopolymers, copolymers, or mixtures thereof.

The term "(meth)acryl . . . " includes "acryl . . . ," "methacryl . . . ," or mixtures thereof.

Compositions and Methods

Described herein are boron nitride/boron nitride nanotube composite fibers and methods of making and use thereof.

As used herein, "a composite fiber" and "the composite fiber" are meant to include any number of composite fibers. Thus, for example "a composite fiber" includes one or more composite fibers. In some embodiments, the composite fiber can comprise a plurality of boron composite nitride fibers.

For example, disclosed herein are methods of making a boron nitride/boron nitride nanotube composite fiber (e.g., a composite fiber comprising boron nitride and boron nitride nanotubes), the methods comprising: spinning a mixture comprising a plurality of boron nanotubes, a polymeric boron nitride precursor, a polymer, and a solvent to form precursor fibers comprising the plurality of boron nitride nanotubes, the polymeric boron nitride precursor, and the polymer, wherein the precursor fibers have a first average outer diameter; drawing the precursor fibers to form drawn fibers, wherein the drawn fibers have a second average outer diameter, the second average outer diameter being less than the first average outer diameter; and heating the drawn fibers while the drawn fibers are under tension to substantially remove the polymer and to substantially convert the polymeric boron nitride precursor into boron nitride, thereby forming the composite fiber.

In some examples, the methods further comprise forming the mixture by: forming a first dispersion by dispersing the plurality of boron nitride nanotubes in a first solvent; forming a second dispersion by dispersing the polymeric boron nitride precursor in a second solvent; contacting the second dispersion with the polymer to form a third dispersion; and contacting the first dispersion with the third dispersion to thereby form the mixture.

In some examples, the methods further comprise forming the mixture by: forming a first dispersion by dispersing the plurality of boron nitride nanotubes in a first solvent; forming a second dispersion by dispersing the polymeric boron nitride precursor in a second solvent; contacting the first dispersion with the polymer to form a fourth dispersion; and contacting the second dispersion with the fourth dispersion to thereby from the mixture.

In some examples, the methods further comprise forming the mixture by forming a first dispersion by dispersing the plurality of boron nitride nanotubes in a first solvent; forming a second dispersion by dispersing the polymeric boron nitride precursor in a second solvent; contacting the first dispersion with the second dispersion to form a fifth dispersion; and contacting the polymer with the fifth dispersion to thereby form the mixture.

In some examples, the methods further comprise forming the mixture by forming a first dispersion by dispersing the plurality of boron nitride nanotubes in a first solvent, contacting the first dispersion with the polymeric boron nitride precursor to form a first precursor mixture, and contacting the first precursor mixture with the polymer to thereby form the mixture.

In some examples, the methods further comprise forming the mixture by forming a first dispersion by dispersing the plurality of boron nitride nanotubes in a first solvent, contacting the first dispersion with the polymer to form a second precursor mixture, and contacting the second precursor mixture with the polymeric boron nitride precursor to thereby form the mixture.

In some examples, the methods further comprise forming the mixture by forming a second dispersion by dispersing the polymeric boron nitride precursor in a second solvent, contacting the second dispersion with the plurality of boron nitride nanotubes to form a third precursor mixture, and contacting the third precursor mixture with the polymer to thereby form the mixture.

In some examples, the methods further comprise forming the mixture by forming a second dispersion by dispersing the polymeric boron nitride precursor in a second solvent, contacting the second dispersion with the polymer to form a fourth precursor mixture, and contacting the fourth precursor mixture with the plurality of boron nitride nanotubes to thereby form the mixture.

The first dispersion can, for example, comprise the plurality of boron nitride nanotubes at a concentration of 0.01 grams boron nitride nanotubes or more per 100 milliliters (mL) of solvent (e.g., 0.02 g/100 mL or more, 0.03 g/100 mL or more, 0.04 g/100 mL or more, 0.05 g/100 mL or more, 0.06 g/100 mL or more, 0.07 g/100 mL or more, 0.08 g/100 mL or more, 0.09 g/100 mL or more, 0.1 g/100 mL or more, 0.15 g/100 mL or more, 0.2 g/100 mL or more, 0.25 g/100 mL or more, 0.3 g/100 mL or more, 0.35 g/100 mL or more, 0.4 g/100 mL or more, 0.45 g/100 mL or more, 0.5 g/100 mL or more, 0.6 g/100 mL or more, 0.7 g/100 mL or more, 0.8 g/100 mL or more, 0.9 g/100 mL or more, 1 g/100 mL or more, 1.25 g/100 mL or more, 1.5 g/100 mL or more, 1.75 g/100 mL or more, 2 g/100 mL or more, 2.25 g/100 mL or more, 2.5 g/100 mL or more, 3 g/100 mL or more, 3.5 g/100 mL or more, 4 g/100 mL or more, or 4.5 g/100 mL or more). In some examples, the first dispersion can comprise the plurality of boron nitride nanotubes at a concentration of 5 grams boron nitride nanotubes or less per 100 mL of solvent (e.g., 4.5 g/100 mL or less, 4 g/100 mL or less, 3.5 g/100 mL or less, 3 g/100 mL or less, 2.5 g/100 mL or less, 2.25 g/100 mL or less, 2 g/100 mL or less, 1.75 g/100 mL or less, 1.5 g/100 mL or less, 1.25 g/100 mL or less, 1 g/100 mL or less, 0.9 g/100 mL or less, 0.8 g/100 mL or less, 0.7 g/100 mL or less, 0.6 g/100 mL or less, 0.5 g/100 mL or less, 0.45 g/100 mL or less, 0.4 g/100 mL or less, 0.35 g/100 mL or less, 0.3 g/100 mL or less, 0.25 g/100 mL or less, 0.2 g/100 mL or less, 0.15 g/100 mL or less, 0.1 g/100 mL or less, 0.09 g/100 mL or less, 0.08 g/100 mL or less, 0.07 g/100 mL or less, 0.06 g/100 mL or less, 0.05 g/100 mL or less, 0.04 g/100 mL or less, 0.03 g/100 mL or less, or 0.02 g/100 mL or less). The concentration of the plurality of boron nitride nanotubes in the first dispersion can range from any of the minimum values described above to any of the maximum values described above. For example, the first dispersion can comprise the plurality of boron nitride nanotubes at a concentration of from 0.01 grams to 5 grams boron nitride nanotubes per 100 milliliters of solvent (e.g., from 0.01 to 2.5 g/100 mL, from 2.5 to 5 g/100 mL, from 0.01 to 0.1 g/100 mL, from 0.1 to 1 g/100 mL, from 1 to 5 g/100 mL, from 0.01 to 4 g/100 mL, from 0.01 to 3 g/100 mL, from 0.01 to 2 g/100 mL, from 0.01 to 1 g/100 mL, from 0.01 to 0.75 g/100 mL, from 0.01 to 0.5 g/100 mL, from 0.05 to 5 g/100 mL, from 0.1 to 5 g/100 mL, from 0.5 to 5 g/100 mL, from 0.05 to 4 g/100 mL, or from 0.1 to 0.5 g/100 mL).

The second dispersion can, for example, comprise the polymeric boron nitride precursor at a concentration of 0.1 grams or more of polymeric boron nitride precursor per 100 milliliters of solvent (e.g., 0.2 g/100 mL or more, 0.3 g/100 mL or more, 0.4 g/100 mL or more, 0.5 g/100 mL or more, 0.75 g/100 mL or more, 1 g/100 mL or more, 1.25 g/100 mL or more, 1.5 g/100 mL or more, 2 g/100 mL or more, 2.5 g/100 mL or more, 3 g/100 mL or more, 3.5 g/100 mL or more, 4 g/100 mL or more, 4.5 g/100 mL or more, 5 g/100 mL or more, 6 g/100 mL or more, 7 g/100 mL or more, 8 g/100 mL or more, 9 g/100 mL or more, 10 g/100 mL or more, 11 g/100 mL or more, 12 g/100 mL or more, 13 g/100 mL or more, 14 g/100 mL or more, 15 g/100 mL or more, 16 g/100 mL or more, 17 g/100 mL or more, 18 g/100 mL or more, 19 g/100 mL or more, 20 g/100 mL or more, 21 g/100 mL or more, 22 g/100 mL or more, 23 g/100 mL or more, or 24 g/100 mL or more). In some examples, the second dispersion can comprise the polymeric boron nitride precursor at a concentration of 25 grams or less of polymeric boron nitride precursor per 100 mL of solvent (e.g., 24 g/100 mL or less, 23 g/100 mL or less, 22 g/100 mL or less, 21 g/100 mL or less, 20 g/100 mL or less, 19 g/100 mL or less, 18 g/100 mL or less, 17 g/100 mL or less, 16 g/100 mL or less, 15 g/100 mL or less, 14 g/100 mL or less, 13 g/100 mL or less, 12 g/100 mL or less, 11 g/100 mL or less, 10 g/100 mL or less, 9 g/100 mL or less, 8 g/100 mL or less, 7 g/100 mL or less, 6 g/100 mL or less, 5 g/100 mL or less, 4.5 g/100 mL or less, 4 g/100 mL or less, 3.5 g/100 mL or less, 3 g/100 mL or less, 2.5 g/100 mL or less, 2 g/100 mL or less, 1.5 g/100 mL or less, 1.25 g/100 mL or less, 1 g/100 mL or less, 0.75 g/100 mL or less, 0.5 g/100 mL or less, 0.4 g/100 mL or less, 0.3 g/100 mL or less, or 0.2 g/100 mL or less). The concentration of the polymeric boron nitride precursor in the second dispersion can range from any of the minimum values described above to any of the maximum values described above. For example, the second dispersion can comprise the polymeric boron nitride precursor at a concentration of from 0.1 grams to 25 grams of polymeric boron nitride precursor per 100 milliliters of solvent (e.g., from 0.1 to 12 g/100 mL, from 12 to 25 g/100 mL, from 0.1 to 5 g/100 mL, from 5 to 10 g/100 mL, from 10 to 15 g/100 mL, from 15 to 20 g/100 mL, from 20 to 25 g/100 mL, from 0.1 to 20 g/100 mL, from 0.1 to 15 g/100 mL, from 0.1 to 10 g/100 mL, from 0.5 to 25 g/100 mL, from 1 to 25 g/100 mL, from 5 to 25 g/100 mL, from 10 to 25 g/100 mL, from 15 to 25 g/100 mL, from 0.5 to 20 g/100 mL, or from 1 to 15 g/100 mL).

The solvent, the first solvent, and the second solvent can independently comprise any suitable solvent. Examples of suitable solvents include, but are not limited to, tetrahydrofuran (THF), N-methyl-2-pyrrolidone (NMP), dimethylformamide (DMF), N-methylformamide, formamide, dimethyl sulfoxide (DMSO), dimethylacetamide, dichloromethane ($CH_2Cl_2$), ethylene glycol, polyethylene glycol, glycerol, alkane diol, tetraglyme, propylene carbonate, diglyme, dimethoxyethane, ethanol, methanol, propanol, isopropanol, water, acetonitrile, chloroform, acetone, hexane, heptane, toluene, xylene, methyl acetate, ethyl acetate, and combinations thereof. In some examples, the first solvent and the second solvent are the same.

The polymer can comprise any suitable polymer. Examples of suitable polymers include, but are not limited to, polyolefins (e.g., polypropylene, polyethylene, polyisobutylene, polymethylpentene, polybutylene, ethylene propylene rubber, and ethylene propylene diene monomer rubber), polycarbonates, ethylene vinyl acetate, polyesters (e.g., polyglycolic acid, polylactic acid, polycaprolactone, polyhydroxyalkanoates, polyethylene terephthalate (PET), polybutylene terephthalate, polytrimethylene terephthalate, and polyethylene naphthalate), polyurethanes, polyamides (e.g., Nylon), polyimides, polystyrene, polyacrylates, ABS (acrylonitrile butadiene styrene copolymers), vinyl polymers (e.g., polyvinyl chloride, polyvinyl alcohol, polyvinyl acetate), fluoropolymers (e.g., polytetrafluoroethylene (PTFE), polyvinylidene fluoride (PVDF)), copolymers thereof, and blends thereof. In some examples, the polymer can comprise a polyacrylonitrile (co) polymer, a poly(methyl (meth) acrylate) (co) polymer, a polyvinyl alcohol (co) polymer, derivatives thereof, or a combination thereof. In some examples, the polymer can comprise a polyacrylonitrile homopolymer, a polyacrylonitrile copolymer (e.g., a copolymer comprising polyacrylonitrile and itaconic acid, (meth)acrylic acid, or a combination thereof), poly(methyl (meth) acrylate), derivatives thereof, or a combination thereof.

In some examples, the methods further comprise agitating the first dispersion before contacting the first dispersion with the third dispersion. In some examples, the methods can further comprise agitating the second dispersion before contacting the second dispersion with the polymer. Agitating the first and/or second dispersion can be accomplished, for example, by mechanical stirring, shaking, vortexing, sonication (e.g., bath sonication, probe sonication, ultrasonication), and the like, or combinations thereof.

As used herein, "a boron nitride nanotube" and "the boron nitride nanotube" are meant to include any number of boron nitride nanotubes. Thus, for example "a boron nitride nanotube" includes one or more boron nitride nanotubes. In some embodiments, the boron nitride nanotube can comprise a plurality of boron nitride nanotubes. As used herein, the term "boron nitride nanotube" or "BNNT" refers to an elongated tubular or cylindrical structure comprising boron nitride.

The plurality of boron nitride nanotubes can, for example, have an average outer diameter of 1 nanometer (nm) or more (e.g., 2 nm or more, 3 nm or more, 4 nm or more, 5 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, or 95 nm or more). In some examples, the plurality of boron nitride nanotubes can have an average outer diameter of 100 nm or less (e.g., 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 15 nm or less, 10 nm or less, or 5 nm or less). The average outer diameter of the plurality of boron nitride nanotubes can range from any of the minimum values described above to any of the maximum values described above. For example, the plurality of boron nitride nanotubes can have an average outer diameter of from 1 nanometer (nm) to 100 nm (e.g., from 1 nm to 50 nm, from 50 nm to 100 nm, from 1 nm to 20 nm, from 20 nm to 40 nm, from 40 nm to 60 nm, from 60 nm to 80 nm, from 80 nm to 100 nm, from 1 nm to 80 nm, from 1 nm to 60 nm, from 1 nm to 40 nm, from 5 nm to 100 nm, from 10 nm to 100 nm, from 20 nm to 100 nm, from 40 nm to 100 nm, form 60 nm to 100 nm, from 5 nm to 95 nm, or from 10 nm to 90 nm). Average outer diameter can be measured using methods known in the art, such as evaluation by electron microscopy (e.g., scanning electron microscopy, transmission electron microscopy, or a combination thereof). In some examples, the average outer diameter can be substantially monodisperse.

In some examples, the plurality of boron nitride nanotubes has an average length of 100 nm or more (e.g., 150 nm or more, 200 nm or more, 250 nm or more, 300 nm or more, 400 nm or more, 500 nm or more, 750 nm or more, 1 micrometer (μm) or more, 1.25 μm or more, 1.5 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 40 μm or more, 50 μm or more, 75 μm or more, 100 μm or more, 125 μm or more, 150 μm or more, 200 μm or more, 250 μm or more, 300 μm or more, 400 μm or more, 500 μm or more, 750 μm or more, 1 millimeter (mm) or more, 1.25 mm or more, 1.5 mm or more, 2 mm or more, 2.5 mm or more, 3 mm or more, 3.5 mm or more, 4 mm or more, 4.5 mm or more, 5 mm or more, 6 mm or more, 7 mm or more, 8 mm or more, or 9 mm or more). In some examples, the plurality of boron nitride nanotubes can have an average length of 10 millimeters (mm) or less (e.g., 9 mm or less, 8 mm or less, 7 mm or less, 6 mm or less, 5 mm or less, 4.5 mm or less, 4 mm or less, 3.5 mm or less, 3 mm or less, 2.5 mm or less, 2 mm or less, 1.5 mm or less, 1.25 mm or less, 1 mm or less, 750 micrometers (μm) or less, 500 μm or less, 400 μm or less, 300 μm or less, 250 μm or less, 200 μm or less, 150 μm or less, 125 μm or less, 100 μm or less, 75 μm or less, 50 μm or less, 40 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.5 μm or less, 1.25 μm or less, 1 μm or less, 750 nanometers (nm) or less, 500 nm or less, 400 nm or less, 300 nm or less, 250 nm or less, 200 nm or less, or 150 nm or less). The average length of the plurality of boron nitride nanotubes can range from any of the minimum values described above to any of the maximum values described above. For example, the plurality of boron nitride nanotubes can have an average length of from 100 nm to 10 millimeters (mm) (e.g., from 100 nm to 50 μm, 50 μm to 10 mm, from 100 nm to 1 μm, from 1 μm to 10 μm, from 10 μm to 100 μm, from 100 μm to 1 mm, from 1 mm to 10 mm, from 100 nm to 5 mm, from 100 nm to 1 mm, from 100 nm to 500 μm, from 100 nm to 100 μm, from 100 nm to 50 μm, from 100 nm to 10 μm, from 100 nm to 1 μm, from 500 nm to 10 mm, from 1 μm to 10 mm, from 10 μm to 10 mm, from 50 μm to 10 mm, from 100 μm to 10 mm, from 500 μm to 10 mm, from 1 mm to 10 mm, from 150 nm to 5 mm, from 200 nm to 2 mm, from 500 nm to 10 mm, or from 1 μm to 50 μm). Average length can be measured using methods known in the art, such as evaluation by electron microscopy (e.g., scanning electron microscopy, transmission electron microscopy, or a combination thereof). In some examples, the average length can be substantially monodisperse.

In some examples, the plurality of boron nitride nanotubes has an average aspect ratio (e.g., average length divided by average outer diameter) of greater than 1 (e.g., 5 or more, 10 or more, 50 or more, 100 or more, 500 or more, $1 \times 10^3$ or more, $5 \times 10^3$ or more, $1 \times 10^4$ or more, $5 \times 10^4$ or more, $1 \times 10^5$ or more, $5 \times 10^5$ or more, $1 \times 10^6$ or more, or $5 \times 10^6$ or more). In some examples, the plurality of boron nitride nanotubes can have an average aspect ratio of $1 \times 10^7$ or less (e.g., $5 \times 10^6$ or less, $1 \times 10^6$ or less, $5 \times 10^5$ or less, $1 \times 10^5$ or less, $5 \times 10^4$ or less, $1 \times 10^4$ or less, $5 \times 10^3$ or less, $1 \times 10^3$ or less, 500 or less, 100 or less, 50 or less, 10 or less, or 5 or less). The average aspect ratio of the plurality of boron nitride nanotubes can range from any of the minimum values described above to any of the maximum values described above. For example, the plurality of boron nitride nanotubes can have an average aspect ratio of from greater than 1 to $1 \times 10^7$ (e.g., from greater than 1 to $1 \times 10^5$, from $1 \times 10^5$ to $1 \times 10^7$, from greater than 1 to 100, from 100 to $1 \times 10^4$, from $1 \times 10^4$ to $1 \times 10^7$, from 5 to $1 \times 10^7$, from 100 to $\times 10^7$, from 500 to $1 \times 10^7$, from $1 \times 10^3$ to $1 \times 10^7$, from greater than 1 to $1 \times 10^6$, from greater than 1 to $1 \times 10^6$, from greater than 1 to $\times 10^5$, from greater than 1 to $\times 10^4$, from greater than 1 to $\times 10^3$, from 5 to $1 \times 10^6$, or from 100 to $1 \times 10^5$).

In some examples, the plurality of boron nitride nanotubes can comprise: a first population of boron nitride nanotubes having a first average outer diameter, a first average length, and a first average aspect ratio; and a second population of boron nitride nanotubes having a second average outer diameter, a second average length, and a second average aspect ratio; wherein the first average outer diameter and the second average outer diameter are different, the first average length and the second average length are different, the first average aspect ratio and the second average aspect ratio are different, or a combination thereof. In some examples, the plurality of boron nitride nanotubes comprise a mixture of a plurality of populations of boron nitride nanotubes, wherein each population of boron nitride nanotubes within the mixture is different with respect to average outer diameter, average length, average aspect ratio, or a combination thereof.

In some examples, the plurality of boron nitride nanotubes can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the average particle size, within 15% of the average particle size, within 10% of the average particle size, or within 5% of the average particle size).

The polymeric boron nitride precursor can comprise any suitable material. For example, the polymeric boron nitride precursor can comprise a borazine compound, such as a borazine-based compound.

In some examples, the methods further comprise agitating the mixture before spinning the mixture. Agitating the mixture can be accomplished, for example, by mechanical stirring, shaking, vortexing, sonication (e.g., bath sonication, probe sonication, ultrasonication), and the like, or combinations thereof. For example, the mixture can be agitated for a first amount of time at a first temperature.

The first amount of time can, for example, be 1 minute or more (e.g., 2 minutes or more, 3 minutes or more, 4 minutes or more, 5 minutes or more, 10 minutes or more, 15 minutes or more, 30 minutes or more, 45 minutes or more, 1 hour or more, 2 hours or more, 3 hours or more, 4 hours or more, 5 hours or more, 6 hours or more, 12 hours or more, 18 hours or more, 24 hours or more, 30 hours or more, 36 hours or more, 42 hours or more, 48 hours or more, 54 hours or more, 60 hours or more, or 66 hours or more). In some examples, the first amount of time can be 72 hours or less (e.g., 66 hours or less, 60 hours or less, 54 hours or less, 48 hours or less, 42 hours or less, 36 hours or less, 30 hours or less, 24 hours or less, 18 hours or less, 12 hours or less, 6 hours or less, 5 hours or less, 4 hours or less, 3 hours or less, 2 hours or less, 1 hour or less, 45 minutes or less, 30 minutes or less, 15 minutes or less, 10 minutes or less, 5 minutes or less, 4 minutes or less, 3 minutes or less, or 2 minutes or less). The first amount of time can range from any of the minimum values described above to any of the maximum values described above. For example, the first amount of time can be from 1 minute to 72 hours (e.g., from 1 minute to 36 hours, from 36 hours to 72 hours, from 1 minute to 1 hour, from 1 hour to 24 hours, from 24 hours to 72 hours, from 30 minutes to 72 hours, from 1 hour to 72 hours, from 6 hours to 72 hours, from 12 hours to 72 hours, from 48 hours to 72 hours, from 1 minute to 60 hours, from 1 minute to 48 hours, from 1 minute to 24 hours, from 1 minute to 12 hours, from 1 minute to 6 hours, from 1 minute to 2 hours, from 5 minutes to 66 hours, or from 15 minutes to 60 hours).

The first temperature can, for example, be 30° C. or less (e.g., 29° C. or less, 28° C. or less, 27° C. or less, 26° C. or less, 25° C. or less, 24° C. or less, 23° C. or less, 22° C. or less, 21° C. or less, 20° C. or less, 19° C. or less, 18° C. or less, 17° C. or less, 16° C. or less, 15° C. or less, 14° C. or less, 13° C. or less, 12° C. or less, 11° C. or less, or 10° C. or less).

In some examples, after the first amount of time, the method further comprises heating the mixture at a second temperature for a second amount of time.

The second temperature can, for example, be 90° C. or less (e.g., 85° C. or less, 80° C. or less, 75° C. or less, 70° C. or less, 65° C. or less, 60° C. or less, or 55° C. or less) In some examples, the second temperature can be 50° C. or more (e.g., 55° C. or more, 60° C. or more, 65° C. or more, 70° C. or more, 75° C. or more, 80° C. or more, or 85° C. or more). The second temperature can range from any of the minimum values described above to any of the maximum values described above. For example, the second temperature can be from 50° C. to 90° C. (e.g., from 50° C. to 70° C., from 70° C. to 90° C., from 50° C. to 60° C., from 60° C. to 70° C., from 70° C. to 80° C., from 80° C. to 90° C., from 60° C. to 90° C., from 50° C. to 80° C., or from 60° C. to 80° C.).

The second amount of time can, for example, be 1 second or more (e.g., 5 seconds or more, 10 seconds or more, 15 seconds or more, 30 seconds or more, 45 seconds or more, 1 minute or more, 2 minutes or more, 3 minutes or more, 4 minutes or more, 5 minutes or more, 10 minutes or more, 15 minutes or more, 30 minutes or more, 45 minutes or more, 1 hour or more, 2 hours or more, 3 hours or more, 4 hours or more, 5 hours or more, 6 hours or more, 12 hours or more, 18 hours or more, 24 hours or more, 30 hours or more, 36 hours or more, 42 hours or more, 48 hours or more, 54 hours or more, 60 hours or more, or 66 hours or more). In some examples, the second amount of time can be 72 hours or less (e.g., 66 hours or less, 60 hours or less, 54 hours or less, 48 hours or less, 42 hours or less, 36 hours or less, 30 hours or less, 24 hours or less, 18 hours or less, 12 hours or less, 6 hours or less, 5 hours or less, 4 hours or less, 3 hours or less, 2 hours or less, 1 hour or less, 45 minutes or less, 30 minutes or less, 15 minutes or less, 10 minutes or less, 5 minutes or less, 4 minutes or less, 3 minutes or less, 2 minutes or less, 1 minute or less, 45 seconds or less, 30 seconds or less, 15 seconds or less, 10 seconds or less, or 5 seconds or less). The second amount of time can range from any of the minimum values described above to any of the maximum values described above. For example, the second amount of time can be from 1 second to 72 hours (e.g., from 1 second to 36 hours, from 36 hours to 72 hours, from 1 second to 1 hour, from 1 hour to 24 hours, from 24 hours to 72 hours, from 30 minutes to 72 hours, from 1 hour to 72 hours, from 6 hours to 72 hours, from 12 hours to 72 hours, from 48 hours to 72 hours, from 1 second to 60 hours, from 1 second to 48 hours, from 1 second to 24 hours, from 1 second to 12 hours, from 1 second to 6 hours, from 1 second to 2 hours, from 1 minute to 66 hours, or from 5 minutes to 60 hours).

In some examples, the method further comprises ceasing agitation for at least a portion of the second amount of time.

In some examples, spinning the mixture comprises electrospinning, wet jet fiber pulling, wet spinning, dry spinning, dry-jet wet spinning, or combinations thereof. In some examples, spinning the mixture comprises dry-jet wet spinning.

In some examples, the precursor fibers are spun into a coagulation bath, the coagulation bath comprising a coagulation solvent. The coagulation solvent can comprise any suitable solvent. Examples of suitable solvents include, but are not limited to, tetrahydrofuran (THF), N-methyl-2-pyrrolidone (NMP), dimethylformamide (DMF), N-methylformamide, formamide, dimethyl sulfoxide (DMSO), dimethylacetamide (DMAc), dichloromethane ($CH_2Cl_2$), ethylene glycol, polyethylene glycol, glycerol, alkane diol, tetraglyme, propylene carbonate, diglyme, dimethoxyethane, ethanol, methanol, propanol, isopropanol, water, acetonitrile, chloroform, acetone, hexane, heptane, toluene, xylene, methyl acetate, ethyl acetate, and combinations thereof. In some examples, the coagulation solvent comprises methanol. In some examples, the coagulation solvent comprises toluene, dimethylacetamide (DMAc), or a combination thereof.

In some examples, the mixture is spun using a spinneret having a diameter of 500 μm or less (e.g., 450 μm or less, 400 μm or less, 350 μm or less, 300 μm or less, 250 μm or less, 225 μm or less, 200 μm or less, 175 μm or less, 150 μm or less, 125 μm or less, 100 μm or less, 75 μm or less, 50 μm or less, 40 μm or less, 30 μm or less, or 20 μm or less). In some examples, the mixture is spun using a spinneret having a diameter of 10 μm or more (e.g., 20 μm or more, 30 μm or more, 40 μm or more, 50 μm or more, 75 μm or more, 100 μm or more, 125 μm or more, 150 μm or more, 175 μm or more, 200 μm or more, 225 μm or more, 250 μm or more, 300 μm or more, 350 μm or more, 400 μm or more, or 450 μm or more). The average diameter of the spinneret can range from any of the minimum values described above to any of the maximum values described above. For example, the mixture can be spun using a spinneret having a diameter of from 10 μm to 500 μm (e.g., from 10 μm to 250 μm, from 250 µm to 500 µm, from 10 µm to 100 µm, from 100 µm to 200 µm, from 200 µm to 300 µm, from 300 µm to 400 µm, from 400 µm to 500 µm, from 10 µm to 400 µm, from 10 µm to 300 µm, from 10 µm to 200 µm, from 10 µm to 100 µm, from 25 µm to 500 µm, from 50 µm to 500 µm, from 100 µm to 500 µm, from 200 µm to 500 µm, from 300 µm to 500 µm, from 25 µm to 450 µm, or from 50 µm to 500 µm).

The precursor fiber has a first average outer diameter, wherein the first average outer diameter is 100 nm or more (e.g., 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 µm or more, 1.25 µm or more, 1.5 µm or more, 1.75 µm or more, 2 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, 90 µm or more, 100 µm or more, 125 µm or more, 150 µm or more, 175 µm or more, 200 µm or more, 225 µm or more, 250 µm or more, 300 µm or more, 350 µm or more, 400 µm or more, or 450 µm or more). In some examples, the precursor fiber has a first average outer diameter of 500 µm or less (e.g., 450 µm or less, 400 µm or less, 350 µm or less, 300 µm or less, 250 µm or less, 225 µm or less, 200 µm or less, 175 µm or less, 150 µm or less, 125 µm or less, 100 µm or less, 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, or 125 nm or less). The first average outer diameter of the precursor fiber can range from any of the minimum values described above to any of the maximum values described above. For example, the precursor fiber can have a first average outer diameter of from 100 nm to 500 µm (e.g., from 100 nm to 10 µm, from 10 µm to 500 µm, from 100 nm to 1 µm, from 1 µm to 10 µm, from 10 µm to 100 µm, from 100 µm to 500 µm, from 100 nm to 400 µm, from 100 nm to 200 µm, from 100 nm to 100 µm, from 100 nm to 50 µm, from 100 nm to 10 µm, from 100 nm to 5 µm, from 250 nm to 500 µm, from 500 nm to 500 µm, from 1 µm to 500 µm, from 5 µm to 500 µm, from 10 µm to 500 µm, from 50 µm to 500 µm, from 150 nm to 450 µm, or from 250 nm to 250 µm). Average outer diameter can be measured using methods known in the art, such as evaluation by electron microscopy (e.g., scanning electron microscopy, transmission electron microscopy, or a combination thereof). In some examples, the average outer diameter can be substantially monodisperse.

In some examples, the precursor fiber comprises 1 wt. % or more of the plurality of boron nitride nanotubes relative to the total weight of the polymer (e.g., 2 wt. % or more, 3 wt. % or more, 4 wt. % or more, 5 wt. % or more, 10 wt. % or more, 15 wt. % or more, 20 wt. % or more, 25 wt. % or more, 30 wt. % or more, 35 wt. % or more, 40 wt. % or more, or 45 wt. % or more). In some examples, the precursor fiber comprises 50 wt. % or less of the plurality of boron nitride nanotubes relative to the total weight of the polymer (e.g., 45 wt. % or less, 40 wt. % or less, 35 wt. % or less, 30 wt. % or less, 25 wt. % or less, 20 wt. % or less, 15 wt. % or less, 10 wt. % or less, or 5 wt. % or less). The amount of boron nitride nanotubes relative to the total weight of the polymer in the precursor fiber can range from any of the minimum values described above to any of the maximum values described above. For example, the precursor fibers can comprise from 1 to 50 wt. % of the plurality of boron nitride nanotubes relative to the total weight of the polymer (e.g., from 1 wt. % to 25 wt. %, from 25 wt. % to 50 wt. %, from 1 wt. % to 10 wt. %, from 10 wt. % to 20 wt. %, from 20 wt. % to 30 wt. %, from 30 wt. % to 40 wt. %, from 40 wt. % to 50 wt. %, from 1 wt. % to 45 wt. %, from 1 wt. % to 40 wt. %, from 1 wt. % to 35 wt. %, from 1 wt. % to 30 wt. %, from 1 wt. % to 20 wt. %, from 1 wt. % to 15 wt. %, from 1 wt. % to 5 wt. %, from 5 wt. % to 50 wt. %, from 10 wt. % to 50 wt. %, from 15 wt. % to 50 wt. %, from 20 wt. % to 50 wt. %, from 30 wt. % to 50 wt. %, from 35 wt. % to 50 wt. %, 5 wt. % to 45 wt. %, from 10 wt. % to 40 wt. %).

In some examples, the precursor fiber comprises 1 wt. % or more of the polymeric boron nitride precursor relative to the total weight of the polymer (e.g., 2 wt. % or more, 3 wt. % or more, 4 wt. % or more, 5 wt. % or more, 10 wt. % or more, 15 wt. % or more, 20 wt. % or more, 25 wt. % or more, 30 wt. % or more, 35 wt. % or more, 40 wt. % or more, 45 wt. % or more, 50 wt. % or more, 55 wt. % or more, 60 wt. % or more, 65 wt. % or more, 70 wt. % or more, or 75 wt. % or more). In some examples, the precursor fiber comprises 80 wt. % or less of the polymeric boron nitride precursor relative to the total weight of the polymer (e.g., 75 wt. % or less, 70 wt. % or less, 65 wt. % or less, 60 wt. % or less, 55 wt. % or less, 50 wt. % or less, 45 wt. % or less, 40 wt. % or less, 35 wt. % or less, 30 wt. % or less, 25 wt. % or less, 20 wt. % or less, 15 wt. % or less, 10 wt. % or less, or 5 wt. % or less). The amount of polymeric boron nitride precursor relative to the total weight of the polymer in the precursor fiber can range from any of the minimum values described above to any of the maximum values described above. For example, the precursor fibers can comprise from 1 to 80 wt. % of the polymeric boron nitride precursor relative to the total weight of the polymer (e.g., from 1 wt. % to 40 wt. %, from 40 wt. % to 80 wt. %, from 1 wt. % to 20 wt. %, from 20 wt. % to 40 wt. %, from 40 wt. % to 60 wt. %, from 60 wt. % to 80 wt. %, from 1 wt. % to 70 wt. %, from 1 wt. % to 60 wt. %, from 1 wt. % to 50 wt. %, from 1 wt. % to 40 wt. %, from 1 wt. % to 30 wt. %, from 1 wt. % to 20 wt. %, from 1 wt. % to 10 wt. %, from 5 wt. % to 80 wt. %, from 10 wt. % to 80 wt. %. from 20 wt. % to 80 wt. %, from 30 wt. % to 80 wt. %, from 50 wt. % to 80 wt. %, or from 5 wt. % to 75 wt. %).

In some examples, the precursor fibers are drawn at a temperature of 20° C. or more (e.g., 25° C. or more, 30° C. or more, 35° C. or more, 40° C. or more, 45° C. or more, 50° C. or more, 60° C. or more, 70° C. or more, 80° C. or more, 90° C. or more, 100° C. or more, 125° C. or more, 150° C. or more, 175° C. or more, 200° C. or more, 225° C. or more, 250° C. or more, 300° C. or more, 350° C. or more, 400° C. or more, 450° C. or more, 500° C. or more, 550° C. or more, 600° C. or more, or 650° C. or more). In some examples, the precursor fibers are drawn at a temperature of 700° C. or less (e.g., 650° C. or less, 600° C. or less, 550° C. or less, 500° C. or less, 450° C. or less, 400° C. or less, 350° C. or less, 300° C. or less, 250° C. or less, 225° C. or less, 200° C. or less, 175° C. or less, 150° C. or less, 125° C. or less, 100° C. or less, 90° C. or less, 80° C. or less, 70° C. or less, 60° C. or less, 50° C. or less, 45° C. or less, 40° C. or less, 35° C. or less, 30° C. or less, or 25° C. or less). The temperature at which the precursor fibers are drawn can range from any of the minimum values described above to any of the maximum values described above. For example, the precursor fibers can be drawn at a temperature of from 20° C. to 700° C. (e.g., from 20° C. to 400° C., from 400° C. to 700° C., from 20° C. to 300° C., from 300° C. to 500° C., from 500° C. to 700° C., from 20° C. to 600° C., from 20° C. to 500° C., from 20° C. to 200° C., from 20° C. to 100° C., from 35° C. to 700° C., from 50° C. to 700° C., from 75° C. to 700° C., from 100° C. to 700° C., from 150° C. to 700° C., from 200° C. to 700° C., from 250° C. to 700° C., from 300° C. to 700° C., from 350° C. to 700° C., from 25° C. to 650° C., from 100° C. to 600° C., from 100° C. to 500° C., from 100° C. to 400° C., from 100° C. to 300° C., from 100° C. to 250° C., from 150° C. to 650° C., or from 200° C. to 600° C.). The drawn fiber has a second average outer diameter, wherein the second average outer diameter is 100 nm or more (e.g., 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 μm or more, 1.25 μm or more, 1.5 μm or more, 1.75 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, or 90 μm or more). In some examples, the drawn fiber has a second average outer diameter of 100 μm or less (e.g., 90 μm or less, 80 μm or less, 70 μm or less, 60 μm or less, 50 μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, or 125 nm or less). The second average outer diameter of the drawn fiber can range from any of the minimum values described above to any of the maximum values described above. For example, the drawn fiber can have a second average outer diameter of from 100 nm to 100 μm (e.g., from 100 nm to 50 μm, from 50 μm to 100 μm, from 100 nm to 1 μm, from 1 μm to 10 μm, from 10 μm to 100 μm, from 100 nm to 90 μm, from 100 nm to 80 μm, from 100 nm to 70 μm, from 100 nm to 60 μm, from 100 nm to 40 μm, from 100 nm to 30 μm, from 100 nm to 20 μm, from 100 nm to 10 μm, from 150 nm to 100 μm, from 200 nm to 100 μm, from 250 nm to 100 μm, from 500 nm to 100 μm, from 750 nm to 100 μm, from 1 μm to 100 μm, from 20 μm to 100 μm, from 30 μm to 100 μm, from 40 μm to 100 μm, from 60 μm to 100 μm, from 80 μm to 100 μm, from 125 nm to 90 μm, or from 150 nm to 80 μm). Average outer diameter can be measured using methods known in the art, such as evaluation by electron microscopy (e.g., scanning electron microscopy, transmission electron microscopy, or a combination thereof). In some examples, the average outer diameter can be substantially monodisperse.

In some examples, the drawn fibers are heated in a tube or box furnace.

In some examples, the drawn fibers are heated in an atmosphere comprising nitrogen, ammonia, helium, argon, or a combination thereof.

In some examples, the tension applied to the drawn fibers during heating is greater than 0 MPa (e.g., 1 MPa or more, 2 MPa or more, 3 MPa or more, 4 MPa or more, 5 MPa or more, 10 MPa or more, 15 MPa or more, 20 MPa or more, 25 MPa or more, 30 MPa or more, 35 MPa or more, 40 MPa or more, 45 MPa or more, 50 MPa or more, 55 MPa or more, 60 MPa or more, 65 MPa or more, 70 MPa or more, 75 MPa or more, 80 MPa or more, 85 MPa or more, 90 MPa or more, or 95 MPa or more). In some examples, the tension applied to the drawn fibers during heating is 100 MPa or less (e.g., 95 MPa or less, 90 MPa or less, 85 MPa or less, 80 MPa or less, 75 MPa or less, 70 MPa or less, 65 MPa or less, 60 MPa or less, 55 MPa or less, 50 MPa or less, 45 MPa or less, 40 MPa or less, 35 MPa or less, 30 MPa or less, 25 MPa or less, 20 MPa or less, 15 MPa or less, 10 MPa or less, or 5 MPa or less). The tension applied to the drawn fibers during heating can range from any of the minimum values described above to any of the maximum values described above. For example, the tension applied to the drawn fibers during heating can be from greater than 0 to 100 MPa (e.g., from greater than 0 MPa to 50 MPa, from 50 MPa to 100 MPa, from greater than 0 MPa to 20 MPa, from 20 MPa to 40 MPa, from 40 MPa to 60 MPa, from 60 MPa to 80 MPa, from 80 MPa to 100 MPa, from greater than 0 MPa to 90 MPa, from greater than 0 MPa to 80 MPa, from greater than 0 MPa to 70 MPa, from greater than 0 MPa to 60 MPa, from greater than 0 MPa to 40 MPa, from greater than 0 MPa to 30 MPa, from 1 MPa to 100 MPa, from 5 MPa to 100 MPa, from 10 MPa to 100 MPa, from 20 MPa to 100 MPa, from 30 MPa to 100 MPa, from 40 MPa to 100 MPa, from 60 MPa to 100 MPa, from 70 MPa to 100 MPa, from 1 MPa to 95 MPa, or from 5 MPa to 90 MPa). In some examples, the applied tension can be selected in view of the desired average outer diameter of the composite fiber.

In some examples the drawn fibers are heated at a temperature of 20° C. or more (e.g., 25° C. or more, 30° C. or more, 35° C. or more, 40° C. or more, 45° C. or more, 50° C. or more, 60° C. or more, 70° C. or more, 80° C. or more, 90° C. or more, 100° C. or more, 125° C. or more, 150° C. or more, 175° C. or more, 200° C. or more, 225° C. or more, 250° C. or more, 300° C. or more, 350° C. or more, 400° C. or more, 450° C. or more, 500° C. or more, 600° C. or more, 700° C. or more, 800° C. or more, 900° C. or more, 1000° C. or more, 1100° C. or more, 1200° C. or more, 1300° C. or more, or more, or 1400° C. or more). In some examples, the drawn fibers are heated at a temperature of 1500° C. or less (e.g., 1400° C. or less, 1300° C. or less, 1200° C. or less, 1100° C. or less, 1000° C. or less, 900° C. or less, 800° C. or less, 700° C. or less, 600° C. or less, 500° C. or less, 450° C. or less, 400° C. or less, 350° C. or less, 300° C. or less, 250° C. or less, 225° C. or less, 200° C. or less, 175° C. or less, 150° C. or less, 125° C. or less, 100° C. or less, 90° C. or less, 80° C. or less, 70° C. or less, 60° C. or less, 50° C. or less, 45° C. or less, 40° C. or less, 35° C. or less, 30° C. or less, or 25° C. or less). The temperature at which the drawn fibers are heated can range from any of the minimum values described above to any of the maximum values described above. For example, the drawn fibers can be heated at a temperature of from 20° C. to 1500° C. (e.g., from 20° C. to 750° C., from 750° C. to 1500° C., from 20° C. to 500° C., from 500° C. to 1000° C., from 1000° C. to 1500° C., from 20° C. to 1400° C., from 20° C. to 1300° C., from 20° C. to 1200° C., from 20° C. to 1100° C., from 20° C. to 1000° C., from 20° C. to 900° C., from 20° C. to 800° C., from 20° C. to 700° C., from 20° C. to 600° C., from 20° C. to 500° C., from 20° C. to 400° C., from 20° C. to 300° C., from 20° C. to 200° C., from 20° C. to 100° C., from 50° C. to 1500° C., from 100° C. to 1500° C., from 200° C. to 1500° C., from 300° C. to 1500° C., from 400° C. to 1500° C., from 500° C. to 1500° C., from 600° C. to 1500° C., from 700° C. to 1500° C., from 800° C. to 1500° C., from 900° C. to 1500° C., from 1000° C. to 1500° C., from 1100° C. to 1500° C., from 1200° C. to 1500° C., from 1300° C. to 1500° C., from 30° C. to 1400° C., or from 50° C. to 1300° C.).

In some examples, the drawn fibers are heated at a heating rate of 0.1° C./minute or more (e.g., 0.2° C./minute or more, 0.3° C./minute or more, 0.4° C./minute or more, 0.5° C./minute or more, 0.6° C./minute or more, 0.7° C./minute or more, 0.8° C./minute or more, 0.9° C./minute or more, 1° C./minute or more, 1.25° C./minute or more, 1.5° C./minute or more, 1.75° C./minute or more, 2° C./minute or more, 2.25° C./minute or more, 2.5° C./minute or more, or 2.75° C./minute or more). In some examples, the drawn fibers are heated at a heating rate of 3.0° C./minute or less (e.g., 2.75° C./minute or less, 2.5° C./minute or less, 2.25° C./minute or less, 2° C./minute or less, 1.75° C./minute or less, 1.5° C./minute or less, 1.25° C./minute or less, 1° C./minute or less, 0.9° C./minute or less, 0.8° C./minute or less, 0.7° C./minute or less, 0.6° C./minute or less, 0.5° C./minute or less, 0.4° C./minute or less, 0.3° C./minute or less, or 0.2° C./minute or less). The heating rate can range from any of the minimum values described above to any of the maximum values described above. For example, the drawn fibers can be heated at a heating rate of from 0.1° C./minute to 3.0° C./minute (e.g., from 0.1° C./minute to 1.5° C./minute, from 1.5° C./minute to 3° C./minute, from 0.1° C./minute to 1° C./minute, from 1° C./minute to 2° C./minute, from 2° C./minute to 3° C./minute, from 0.2° C./minute to 3° C./minute, from 0.3° C./minute to 3° C./minute, from 0.4° C./minute to 3° C./minute, from 0.5° C./minute to 3° C./minute, from 0.6° C./minute to 3° C./minute, from 0.7° C./minute to 3° C./minute, from 0.8° C./minute to 3° C./minute, from 0.9° C./minute to 3° C./minute, from 1° C./minute to 3° C./minute, from 0.1° C./minute to 2.75° C./minute, from 0.1° C./minute to 2.5° C./minute, from 0.1° C./minute to 2.25° C./minute, from 0.1° C./minute to 2° C./minute, from 0.1° C./minute to 1.75° C./minute, from 0.2° C./minute to 2.75° C./minute, or from 0.5° C./minute to 2.5° C./minute).

In some examples, the composite fiber has an average outer diameter of 100 nm or more (e.g., 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 μm or more, 1.25 μm or more, 1.5 μm or more, 1.75 μm or more, 2 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, or 45 μm or more). In some examples, the composite fiber has an average outer diameter of 50 μm or less (e.g., 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, or 125 nm or less). The average outer diameter of the composite fiber can range from any of the minimum values described above to any of the maximum values described above. For example, the composite fiber can have an average outer diameter of from 100 nm to 50 μm (e.g., from 100 nm to 25 μm, from 25 μm to 50 μm, from 100 nm to 1 μm, from 1 μm to 10 μm, from 10 μm to 50 μm, from 100 nm to 40 μm, from 100 nm to 30 μm, from 100 nm to 20 μm, from 100 nm to 10 μm, from 150 nm to 50 μm, from 200 nm to 50 μm, from 250 nm to 50 μm, from 500 nm to 50 μm, from 750 nm to 50 μm, from 1 μm to 50 μm, from 20 μm to 50 μm, from 125 nm to 45 μm, or from 150 nm to 40 μm). Average outer diameter can be measured using methods known in the art, such as evaluation by electron microscopy (e.g., scanning electron microscopy, transmission electron microscopy, or a combination thereof). In some examples, the average outer diameter can be substantially monodisperse.

In some examples, the composite fiber has a modulus of 5 GPa or more (e.g., 10 GPa or more, 15 GPa or more, 20 GPa or more, 25 GPa or more, 30 GPa or more, 35 GPa or more, 40 GPa or more, 45 GPa or more, 50 GPa or more, 60 GPa or more, 70 GPa or more, 80 GPa or more, 90 GPa or more, 100 GPa or more, 125 GPa or more, 150 GPa or more, 175 GPa or more, 200 GPa or more, 225 GPa or more, 250 GPa or more, 300 GPa or more, 350 GPa or more, 400 GPa or more, or 450 GPa or more). In some examples, the composite fiber can have a modulus of 500 GPa or less (e.g., 450 GPa or less, 400 GPa or less, 350 GPa or less, 300 GPa or less, 250 GPa or less, 225 GPa or less, 200 GPa or less, 175 GPa or less, 150 GPa or less, 125 GPa or less, 100 GPa or less, 90 GPa or less, 80 GPa or less, 70 GPa or less, 60 GPa or less, 50 GPa or less, 45 GPa or less, 40 GPa or less, 35 GPa or less, 30 GPa or less, 25 GPa or less, 20 GPa or less, 15 GPa or less, or 10 GPa or less). The modulus of the composite fiber can range from any of the minimum values described above to any of the maximum values described above. For example, the composite fiber can have a modulus of from 5 GPa to 500 GPa (e.g., from 5 GPa to 250 GPa, from 250 GPa to 500 GPa, from 5 GPa to 100 GPa, from 100 GPa to 200 GPa, from 200 GPa to 300 GPa, from 300 GPa to 400 GPa, from 400 GPa to 500 GPa, from 10 GPa to 500 GPa, from 25 GPa to 500 GPa, from 50 GPa to 500 GPa, from 75 GPa to 500 GPa, from 100 GPa to 500 GPa, from 150 GPa to 500 GPa, from 200 GPa to 500 GPa, from 225 GPa to 500 GPa, from 300 GPa to 500 GPa, from 350 GPa to 500 GPa, from 5 GPa to 450 GPa, from 5 GPa to 400 GPa, from 5 GPa to 350 GPa, from 5 GPa to 300 GPa, from 5 GPa to 225 GPa, from 5 GPa to 200 GPa, from 5 GPa to 150 GPa, from 5 GPa to 100 GPa, from 10 GPa to 450 GPa, or from 50 GPa to 400 GPa).

In some examples, the composite fiber has a tensile strength of 25 MPa or more (e.g., 30 MPa or more, 35 MPa or more, 40 MPa or more, 45 MPa or more, 50 MPa or more, 60 MPa or more, 70 MPa or more, 80 MPa or more, 90 MPa or more, 100 MPa or more, 125 MPa or more, 150 MPa or more, 175 MPa or more, 200 MPa or more, 225 MPa or more, 250 MPa or more, 300 MPa or more, 350 MPa or more, 400 MPa or more, 450 MPa or more, 500 MPa or more, 600 MPa or more, 700 MPa or more, 800 MPa or more, 900 MPa or more, 1 GPa or more, 1.25 GPa or more, 1.5 GPa or more, 1.75 GPa or more, 2 GPa or more, 2.25 GPa or more, 2.5 GPa or more, 3 GPa or more, 3.5 GPa or more, 4 GPa or more, or 4.5 GPa or more). In some examples, the composite fiber can have a tensile strength of 5 GPa or less (e.g., 4.5 GPa or less, 4 GPa or less, 3.5 GPa or less, 3 GPa or less, 2.5 GPa or less, 2.25 GPa or less, 2 GPa or less, 1.75 GPa or less, 1.5 GPa or less, 1.25 GPa or less, 1 GPa or less, 900 MPa or less, 800 MPa or less, 700 MPa or less, 600 MPa or less, 500 MPa or less, 450 MPa or less, 400 MPa or less, 350 MPa or less, 300 MPa or less, 250

MPa or less, 225 MPa or less, 200 MPa or less, 175 MPa or less, 150 MPa or less, 125 MPa or less, 100 MPa or less, 90 MPa or less, 80 MPa or less, 70 MPa or less, 60 MPa or less, 50 MPa or less, 45 MPa or less, 40 MPa or less, 35 MPa or less, or 30 MPa or less). The tensile strength of the composite fiber can range from any of the minimum values described above to any of the maximum values described above. For example, the composite fiber can have a tensile strength of from 25 MPa to 5 GPa (e.g., from 25 MPa to 500 MPa, from 500 MPa to 5 GPa, from 25 MPa to 250 MPa, from 250 MPa to 500 MPa, from 500 MPa to 750 MPa, from 750 MPa to 1 GPa, from 1 GPa to 2.5 GPa, from 2.5 GPa to 5 GPa, from 25 MPa to 4 GPa, from 25 MPa to 3 GPa, from 25 MPa to 2 GPa, from 25 MPa to 1 GPa, from 25 MPa to 900 MPa, from 25 MPa to 800 MPa, from 25 MPa to 700 MPa, from 25 MPa to 600 MPa, from 25 MPa to 400 MPa, from 25 MPa to 300 MPa, from 50 MPa to 5 GPa, from 100 MPa to 5 GPa, from 200 MPa to 5 GPa, from 300 MPa to 5 GPa, from 400 MPa to 5 GPa, from 600 MPa to 5 GPa, from 700 MPa to 5 GPa, from 800 MPa to 5 GPa, from 900 MPa to 5 GPa, from 1 GPa to 5 GPa, from 2 GPa to 5 GPa, from 50 MPa to 4 GPa, or from 100 MPa to 2 GPa).

In some examples, the composite fiber has a high thermal conductivity, high temperature oxidative resistance, low electrical conductivity, or a combination thereof.

In some examples, the methods further comprise heat treating the composite fiber. Heat treating the composite fiber can, for example, comprise heating the composite fiber at a temperature of 1500° C. or more in an inert environment (e.g., 1550° C. or more, 1600° C. or more, 1650° C. or more, 1700° C. or more, 1750° C. or more, 1800° C. or more, 1850° C. or more, 1900° C. or more, 1950° C. or more, 2000° C. or more, 2050° C. or more, 2100° C. or more, or 2150° C. or more). In some examples, heat treating the composite fiber can comprise heating the composite fiber at a temperature of 2200° C. or less in an inert environment (e.g., 2150° C. or less, 2100° C. or less, 2050° C. or less, 2000° C. or less, 1950° C. or less, 1900° C. or less, 1850° C. or less, 1800° C. or less, 1750° C. or less, 1700° C. or less, 1650° C. or less, 1600° C. or less, or 1550° C. or less). The temperature at which the composite fiber is heat treated can range from any of the minimum values described above to any of the maximum values described above. For example, heat treating the composite fiber can comprise heating the composite fiber at a temperature of from 1500° C. to 2200° C. in an inert environment (e.g., from 1500° C. to 1850° C., from 1850° C. to 2200° C., from 1500° C. to 1600° C., from 1600° C. to 1700° C., from 1700° C. to 1800° C., from 1800° C. to 1900° C., from 1900° C. to 2000° C., from 2000° C. to 2100° C., from 2100° C. to 2200° C., from 1500° C. to 2100° C., from 1500° C. to 2000° C., from 1500° C. to 1900° C., from 1500° C. to 1800° C., from 1500° C. to 1750° C., from 1500° C. to 1700° C., from 1600° C. to 2200° C., from 1700° C. to 2200° C., from 1750° C. to 2000° C., from 1800° C. to 2200° C., from 1900° C. to 2200° C., from 2000° C. to 2200° C., from 1600° C. to 2100° C., from 1600° C. to 2000° C., from 1700° C. to 2000° C., from 1800° C. to 2000° C., or from 1550° C. to 1950° C.).

Also disclosed herein are composite fibers made by any of the methods disclosed herein. Also described herein are objects and articles of manufacture comprising any of the composite fibers made by any of the methods described herein. Also disclosed herein are composite materials comprising the composite fibers made by any of the methods disclosed herein. Also described herein are methods of use of any of the composite fibers or composite materials comprising said composite fibers described herein.

The average outer diameter of the boron nitride nanotubes, the average length of the boron nitride nanotubes, the average aspect ratio of the boron nitride nanotubes, the concentration of the boron nitride nanotubes, the polymeric boron nitride precursor, the concentration of the polymeric boron nitride precursor, the polymer, the solvent, the average outer diameter of the precursor fiber, the spinning conditions, the drawing conditions, the heating conditions (e.g., temperature, heating rate etc.), the applied tension, the average outer diameter of the drawn fiber, the average outer diameter of the composite fiber, or a combination thereof can be selected in view of a variety of factors. For example, the average outer diameter of the boron nitride nanotubes, the average length of the boron nitride nanotubes, the average aspect ratio of the boron nitride nanotubes, the concentration of the boron nitride nanotubes, the polymeric boron nitride precursor, the concentration of the polymeric boron nitride precursor, the polymer, the solvent, the average outer diameter of the precursor fiber, the spinning conditions, the heating conditions (e.g., temperature, heating rate etc.), the drawing conditions, the applied tension, the average outer diameter of the drawn fiber, the average outer diameter of the composite fiber, or a combination thereof can be selected based on the desired mechanical, thermal, and/or electrical properties of the composite fiber, the desired mechanical, thermal, and/or electrical properties of the composite material including the composite fiber, the desired use of the composite fiber or the composite material including said composite fiber, or a combination thereof.

The examples below are intended to further illustrate certain aspects of the methods and compositions described herein and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1-Hybrid Boron Nitride (BN)/Boron Nitride Nanotube (BNNT) Fibers

Multiple pathways to create boron nitride (BN) fibers have been reported including the use of preceramic polymers (polymer derived ceramics, PDCs) and inorganic materials (boron oxide) [1, 2]. More recently, two methods have been reported for making boron nitride nanotube (BNNT) fibers: wet spinning of BNNT solution [3] and direct spinning of BNNT plume from the synthesis reactor [4]. The wet spinning involves forming liquid crystalline (LC) phase of BNNT in superacid such as chlorosulfonic acid, and resulted in BNNT fibers with an average modulus of 1.5 GPa and an average tensile strength of 16 MPa [3]. BNNT preparation using high-enthalpy plasma to manufacture kilogram quantities of high-purity BNNTs resulted in BNNT yarn or fiber spun directly from the plasma with a modulus of ~0.5 GPa and a tensile strength of ~10 MPa [4].

For the purposes of structural, fiber-reinforced composites, the mechanical properties (tensile strength, elastic modulus, etc.) of the fibers should, in general, exceed that of the matrix. Previous fibers made from BNNTs lack sufficient strength and/or modulus to offer utility as a structural reinforcement, which is typically the primary purpose of such fibers. BN fibers have strength values up to 2.0 GPa reported [5], but can be limited due to processing restrictions and cost. h-BN can achieve high strength values when treated at high temperatures (1800-2000° C.) and BNNTs are capable of high orientation, leading to an increase in tensile modulus. A hybrid (BN/BNNT) fiber approach can take advantage of both of these points.

To date, there are no reports of a hybrid BN/BNNT fiber which can combine favorable aspects of both systems to create high strength and modulus fibers. Described herein are methods of manufacturing composite BN/BNNT fibers.

Described herein are composite BN/BNNT fibers and methods of making thereof. This has been achieved by dispersing a polymeric BN precursor such as a preceramic (e.g., poly [B-(methylamino) borazine] (PB)) and BNNTs in a polymer solution, spinning the resulting polymer/polymeric BN precursor/BNNT dispersion, drawing the as-spun fibers, and then heating the drawn fiber in different environments and to different temperatures, under tension, to remove the polymer and to convert the polymeric BN precursor to BN, thus resulting in a composite BN/BNNT fiber.

These hybrid BN/BNNT fibers have been characterized mechanically, structurally, and elementally. These hybrid fibers can also be suitable for various composites, such as fiber-reinforced composites. The BN/BNNT fibers as well as BN/BNNT fiber containing composites can be suitable in applications requiring high thermal conductivity, high temperature oxidative resistance, and low electrical conductivity (electrical insulator).

This work to-date has resulted in BN/BNNT fiber that has an average modulus as high as 55 GPa (with a high value of 121 GPa) and an average tensile strength as high as 142 MPa (with a high value of 327 MPa). Further processing optimization and by increasing the heat-treatment temperature to 1800 to 2000° C. or higher can increase properties beyond what has been achieved so far.

Fiber spinning: Precursor polymer/polymeric BN precursor/BNNT fibers were spun from a polymer, polymeric BN precursor, BNNT dispersion. The polymer/polymeric BN precursor/BNNT precursor fiber contained between 1 and 50 wt % polymeric BN precursor and between 1 and 50 wt % BNNT, with respect to the total weight of the polymer.

First, mechanical stirring was used to disperse the polymeric BN precursor in a solvent (e.g., dimethylacetamide, DMAc) with a concentration of between 1 and 10 g polymeric BN precursor/100 mL. This dispersion was then added to a polymer slurry at room temperature.

Second, a dispersion of BNNT in a solvent (e.g., DMAc) with a concentration of between .01 and .5 g BNNT/100 mL was sonicated using a bath sonicator. The dispersion can then be added to a reactor with the polymer/polymeric BN precursor dispersion while stirring at a temperature of less than 20° C.

After 1 hr stirring the temperature is increased to >50° C. and subsequently decreased for excess solvent evaporation.

Once the solution reaches a suitable viscosity and fiber-forming tendency, fibers are spun into a methanol coagulation bath. This setup allowed for continuous dry-jet wet spinning, using a spinneret with diameter of less than 500 μm.

Fiber Drawing: Fiber drawing was conducted in an inert environment at a temperature greater than 100° C.

Conversion to BN/BNNT hybrid fiber: The polymer/polymeric BN precursor/BNNT precursor fiber underwent heat-treatment to remove the polymer, to further align BNNTs, and to convert the polymeric BN precursor to BN. This was done in a tube furnace under ammonia and nitrogen, while maintaining tension. Tension during heat-treatment was between 0 to 100 MPa, based on the final BN/BNNT hybrid fiber diameter, number of filaments, and the hanging weight.

Further BN/BNNT hybrid fiber heat treatment: The BN/BNNT fiber can be further heat treated to 1800 and then to 2000° C. in an inert environment to further improve properties.

REFERENCES

1. Cornu D et al. Alkylaminoborazine-based precursors for the preparation of boron nitride fibers by the polymer-derived ceramics (PDCs) route. Journal of the European Ceramic Society 2005, 25 (2-3), 111-121.
2. Qiu Y et al. Synthesis of continuous boron nitride nanofibers by solution coating electrospun template fibers. Nanotechnology 2009, 20 (34), 345603.
3. Simonsen Ginestra C J et al. Liquid crystals of neat boron nitride nanotubes and their assembly into ordered macroscopic materials. Nature Communications 2022, 13 (1), 1-8.
4. U.S. Pat. No. 9,862,604
5. Bernard S et al. Chemical tailoring of Single-Source molecular and polymeric precursors for the preparation of ceramic fibers. Journal of Optoelectronics and Advanced Materials 2006, 8 (2), 648.

Example 2-Hybrid Boron Nitride (BN)/Boron Nitride Nanotube (BNNT) Fibers

Ceramics such as boron nitride (BN) are attractive materials considering their high oxidation resistance and low dielectric constant, particularly for BN. However, BN's mechanical properties can be limited on the bulk scale, so attention must be focused on improving this property for applications which require high strength materials. For this reason, this work describes the production of a hybrid BN/BNNT fiber. A solution-based approach is used to combine a polymeric BN precursor, such as a preceramic polymer, and BNNTs along with a sacrificial polymer and spun into fibers. These fibers are converted to the hybrid BN/BNNT fiber by a two-step heat treatment process. These BN/BNNT fibers are characterized structurally and elementally to confirm the structure. The maximum strength obtained is 142 MPa and maximum modulus is 55 GPa. This solution-based approach to creating hybrid BN/BNNT fibers is versatile and can be maximized to create higher strength BN/BNNT fibers, by further processing optimization and by further increasing the heat-treatment temperature to 1800° C. or higher.

The composite fibers can be used in applications needing a high strength, thermally conducting but electrically insulating material which has good transparency to electromagnetic radiation.

The strength and modulus of the composite fibers disclosed herein have been improved over current state of the art BNNT fibers. The composite fibers can be used in defense and electronics applications.

The dispersion/solution based approach disclosed herein allows for a more versatile method of manufacturing the composite fibers compared to other methods that have been reported to make BN or BNNT fibers. The method reported herein is a scalable manufacturing process, e.g. the method can be scaled up for manufacturing large scale quantities of fibers.

Example 3-Hybrid Boron Nitride (BN)/Boron Nitride Nanotube (BNNT) Fibers

Disclosed herein are composite fibers and methods of making and use thereof.

The methods comprise forming a dispersion comprising BNNTs, a polymer, a polymeric BN precursor, and a solvent, followed by spinning and drawing.

Figure 2:
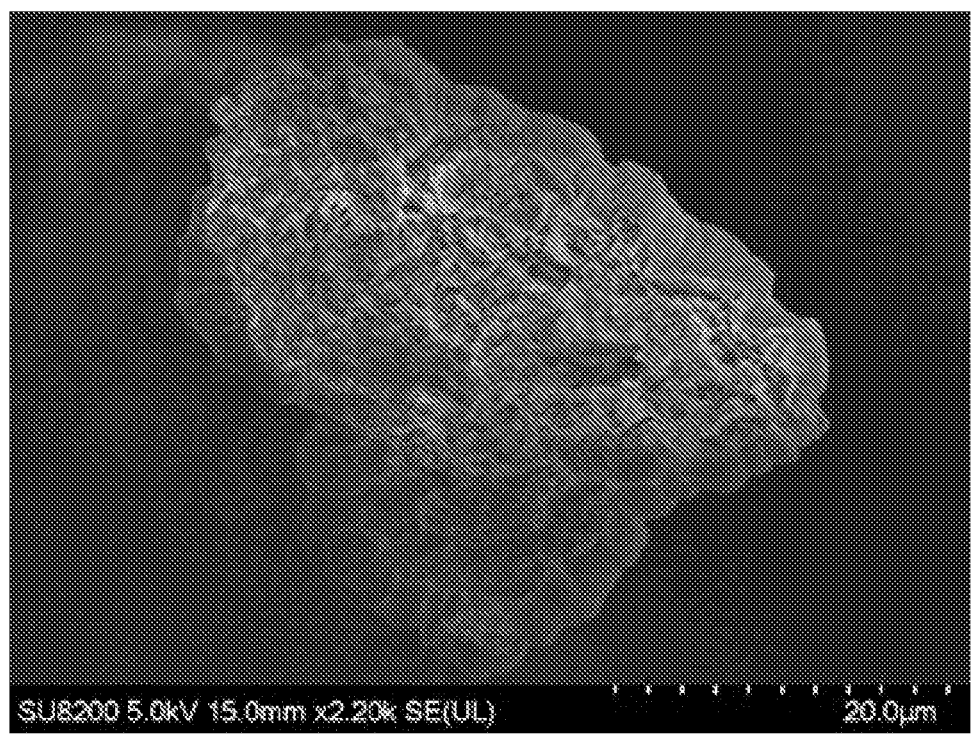
FIG. 2. SEM image of tensile fracture of polymer/polymeric BN precursor/BNNT precursor drawn fiber.
Figure 3:
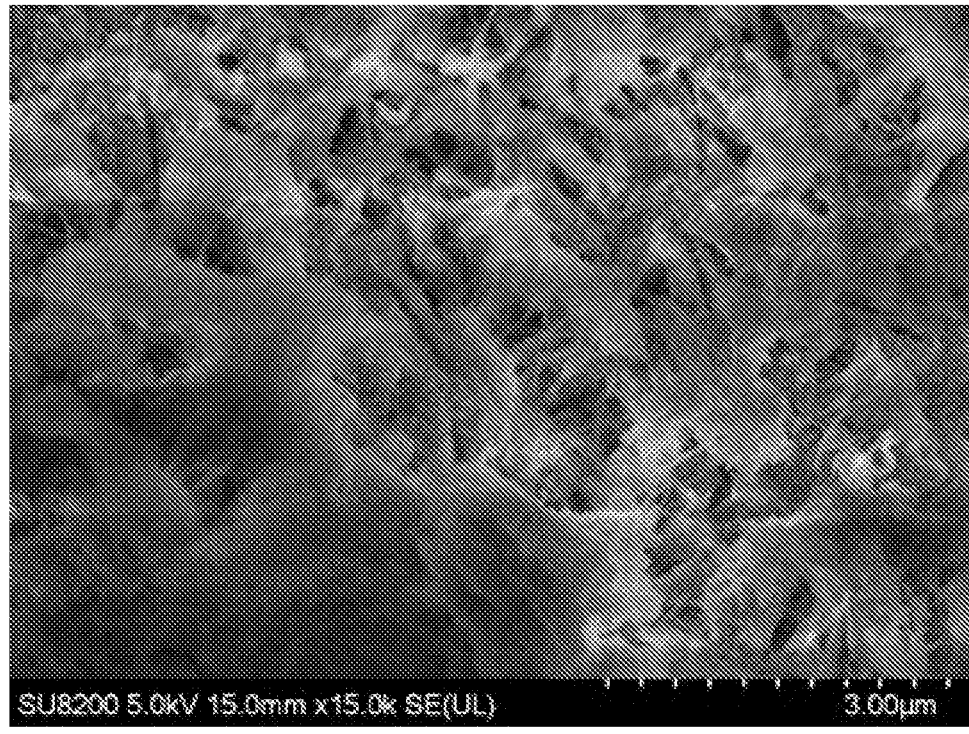
FIG. 3. SEM image of tensile fracture of polymer/polymeric BN precursor/BNNT precursor drawn fiber.

A photograph of a drawn precursor fiber is shown in FIG. 1. SEM images of tensile fracture of polymer/polymeric BN precursor/BNNT precursor drawn fibers are shown in FIG. 2 and FIG. 3.

Tensile tests were performed on the precursor fibers. Tensile tests were performed on a TA instruments Rheometric Solids Analyzer, RSAIII using a strain rate of 1%/see for precursor fiber (6, 12, 25 mm gauge length) and 0.1%/see for BN/BNNT fibers (6, 12, 25 mm gauge length). Tensile strength is calculated as the maximum stress before fiber breakage and tensile modulus is calculated from the slope of the stress-strain curve.

The results for two different precursor fibers having two different polymeric BN precursor/BNNT weight ratios are Ammonia and nitrogen environments.

Inert gases such as He and Ar can be used in some heat-treatment steps.

Temperatures from room temperature to 1000, to 1100, and to 1500° C.

Higher temperatures 1800 to 2000° C. can be used.

Heating rates between 0.5-3.0° C./min

Tension can be applied to the fiber during heat treatment

Tension created stress between 0 to 50 MPa

Figure 6:
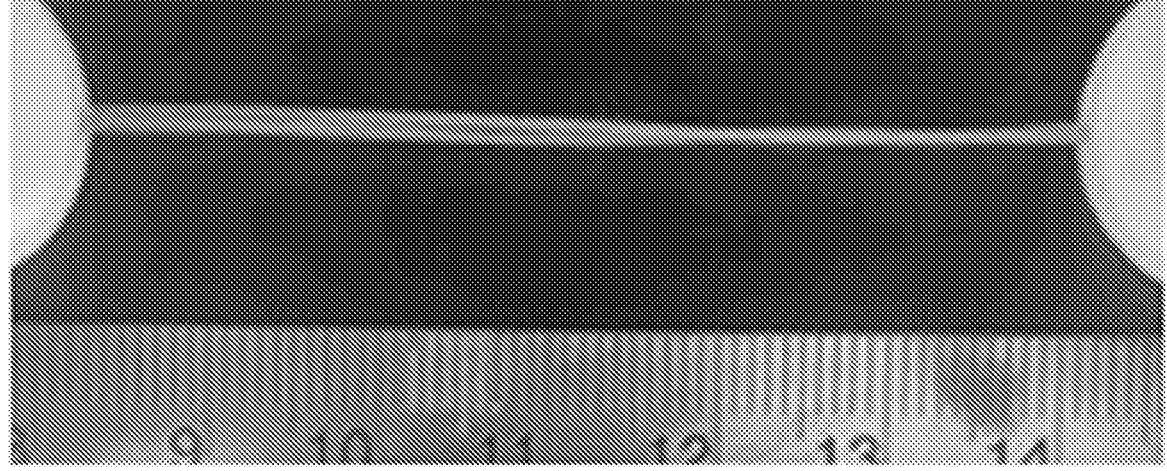
FIG. 6. Photograph of BN/BNNT fiber bundle after heat treatment.
Figure 7:
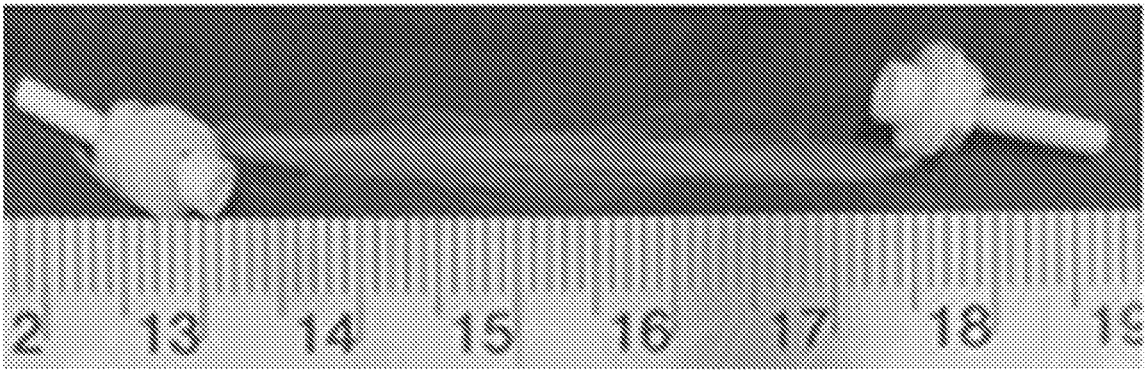
FIG. 7. Photograph of BN/BNNT fiber bundle after heat treatment.

Stress is calculated from the precursor fiber diameter, number of filaments, and the hanging weight Photographs of BN/BNNT fibers at two different BN precursor/BNNT weight ratios are shown in FIG. 6 and FIG. 7.

Figure 8:
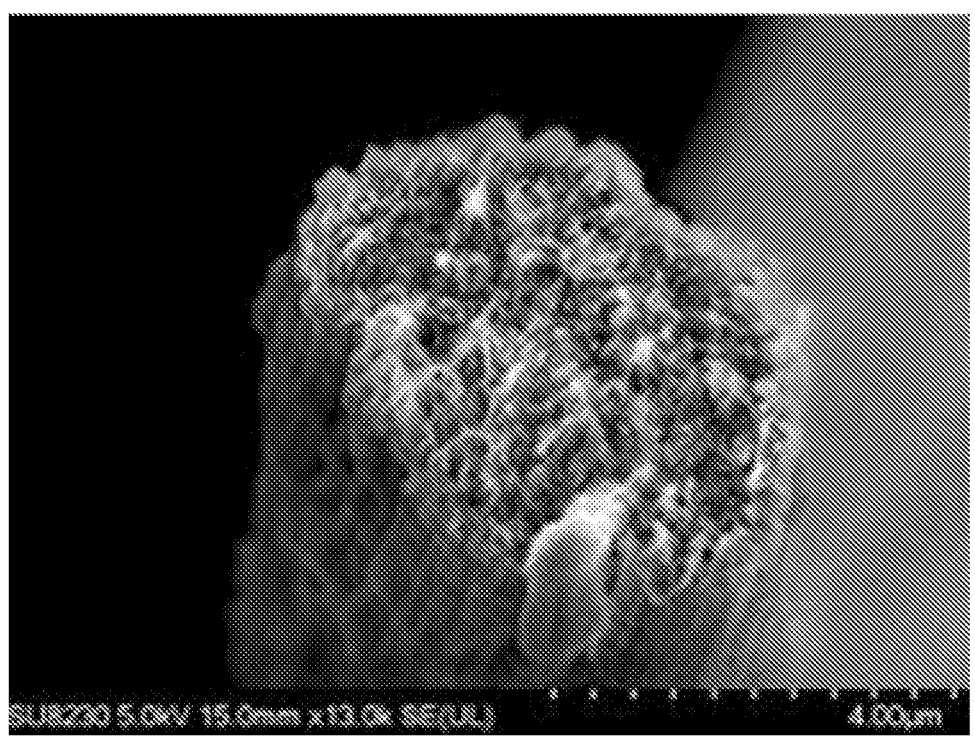
FIG. 8. SEM image of BN/BNNT fiber after heat treatment at 1100° C.
Figure 9:
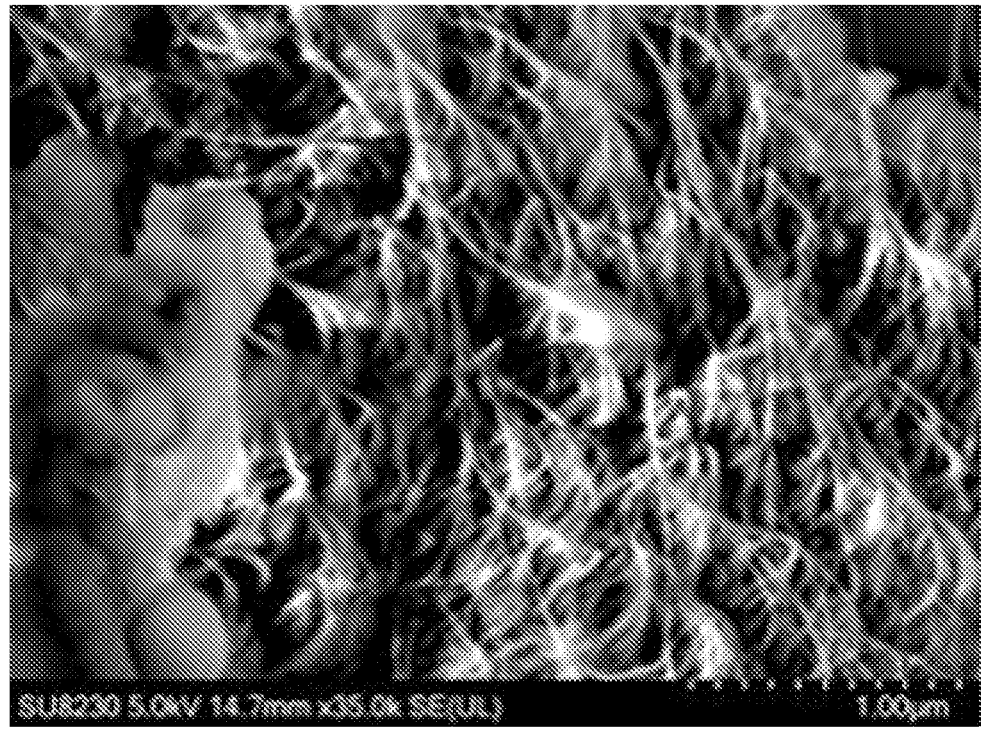
FIG. 9. SEM image of BN/BNNT fiber after heat treatment at 1100° C.
Figure 10:
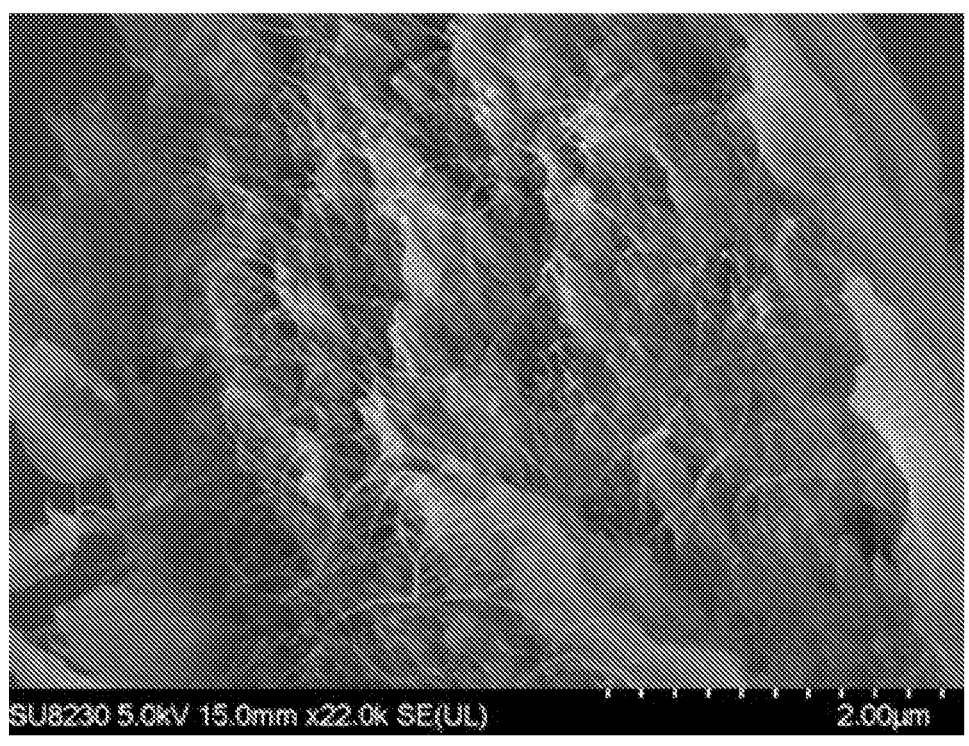
FIG. 10. SEM image of BN/BNNT fiber after heat treatment at 1500° C.
Figure 11:
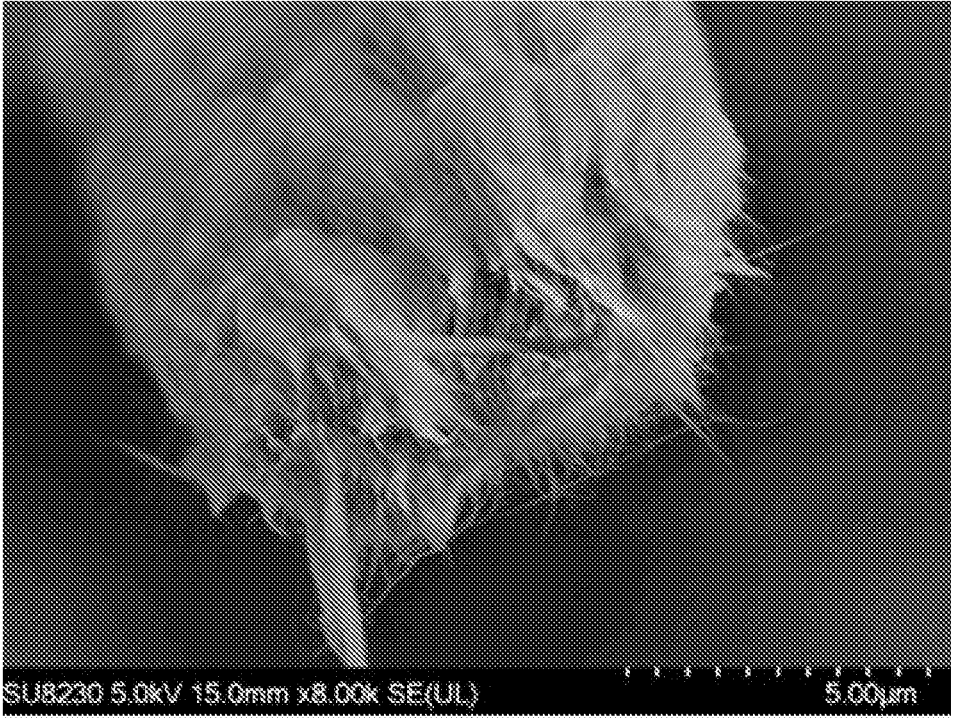
FIG. 11. SEM image of BN/BNNT fiber after heat treatment at 1500° C.

The morphology of the BN/BNNT fibers were characterized using electron microscopy. Images of BN/BNNT fibers from two different polymeric BN precursor/BNNT weight ratios after treatment at 1100° C. are shown in FIG. 8 and FIG. 9. Images of BN/BNNT fibers from two different polymeric BN precursor/BNNT weight ratios after treatment at 1500° C. are shown in FIG. 10 and FIG. 11. The images show the hybrid nature of the fibers, as BNNT fibrils can be seen protruding from the main BN matrix of the fibers.

Figure 12:
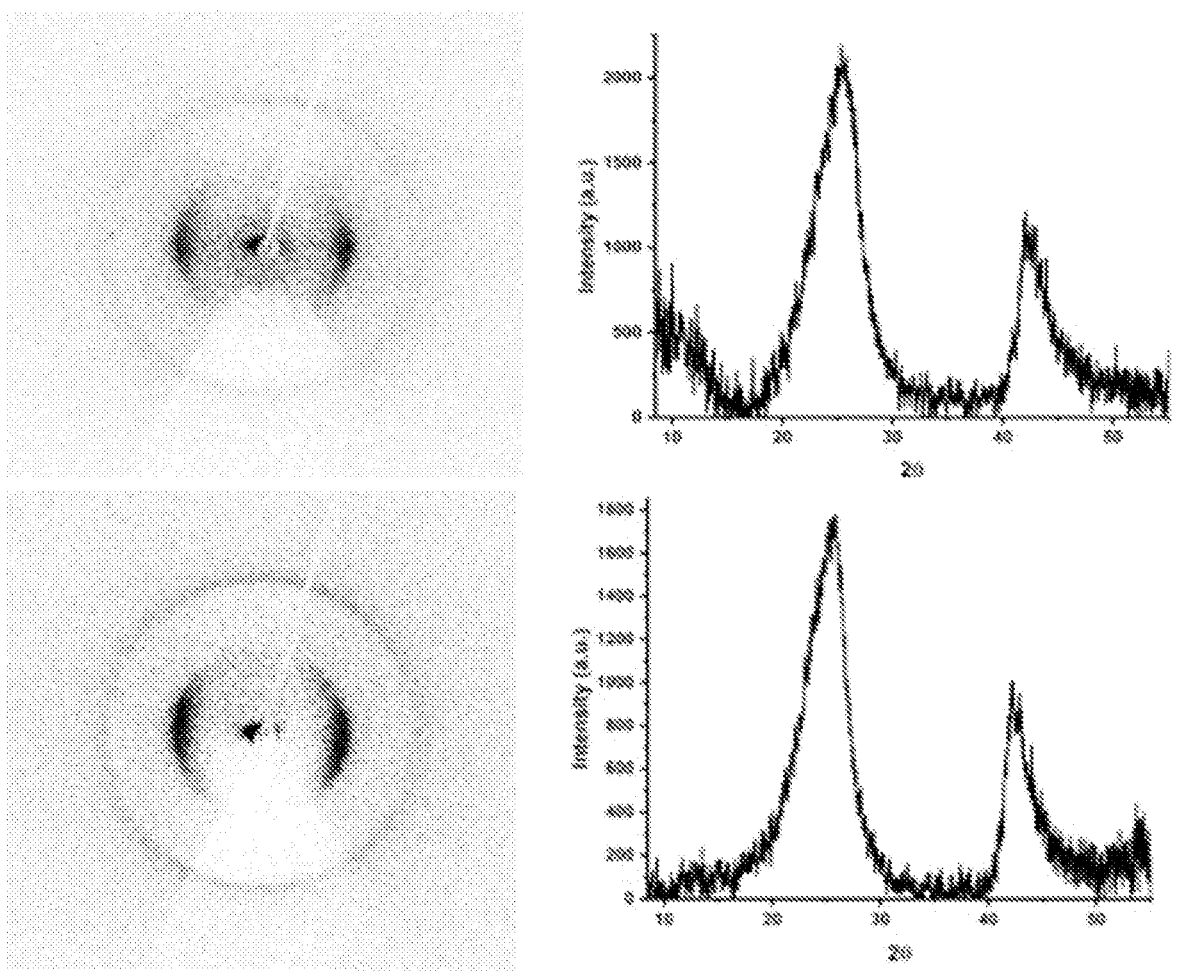
FIG. 12. WAXD flat plate images (left) and integrated scans (right) of BN/BNNT fibers.

The BN/BNNT fiber structure was characterized. WAXD plate images (left) and integrated scans (right) of BN/BNNT fibers with two different polymeric BN precursor/BNNT weight ratios are shown in FIG. 12. The arc from the images indicates BN orientation and integrated scans show characteristic BN peaks at 26° and 42°.

The results shown herein indicate that the methods herein have provided progress towards high-performance BN/BNNT fibers.

Hybrid BN/BNNT fibers with 4-8 μm diameter have been processed. These fibers show some BN orientation (determined from WAXD). Tensile strength exceeding 140 MPa (high of 327 MPa) and tensile modulus exceeding 50 GPa (with a high value of 121 GPa).

A summary of BN/BNNT properties made by the methods herein is provided in Table 1.

TABLE 1

| | Hybrid BN/BNNT fiber properties. | | | |
|---|---|---|---|---|
| Sample ID: | P9A3 | P10A7 | P9N3 | P10N7 |
| Elemental composition | $B_{0.95}N_{1.00}C_{0.13}O_{0.08}$ | $B_{0.96}N_{1.00}C_{0.15}O_{0.06}$ | $B_{0.95}N_{1.00}C_{0.13}O_{0.06}$ | $B_{1.00}N_{1.00}C_{0.16}O_{0.06}$ |
| Shrinkage (%)* | −5 | −7 | 0 | 0 |
| Equivalent fiber diameter (μm) | 4.4 ± 0.4 | 6.6 ± 0.8 | 4.5 ± 0.5 | 6.6 ± 0.8 |
| Average tensile strength (MPa) [max] | 105 ± 39 [152] | 93 ± 28 [139] | 95 ± 36 [159] | 142 ± 89 [327] |
| Average Young's modulus (GPa) [max] | 44 ± 16 [73] | 35 ± 15 [57] | 44 ± 13 [63] | 55 ± 31 [121] |

Figure 4:
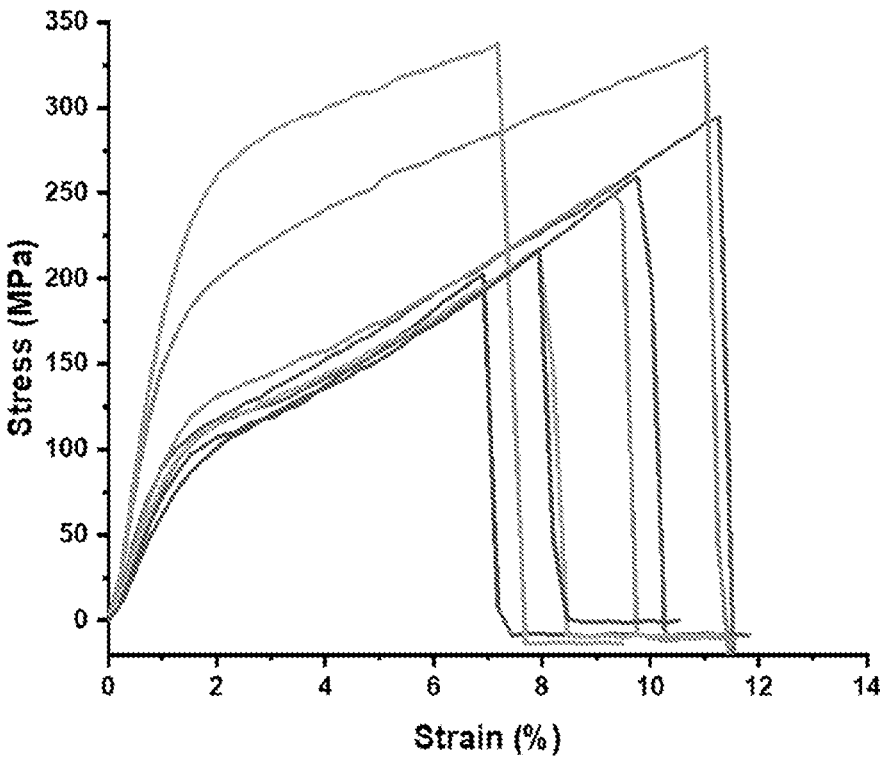
FIG. 4. Polymer/polymeric BN precursor/BNNT precursor fiber stress-strain curves.
Figure 5:
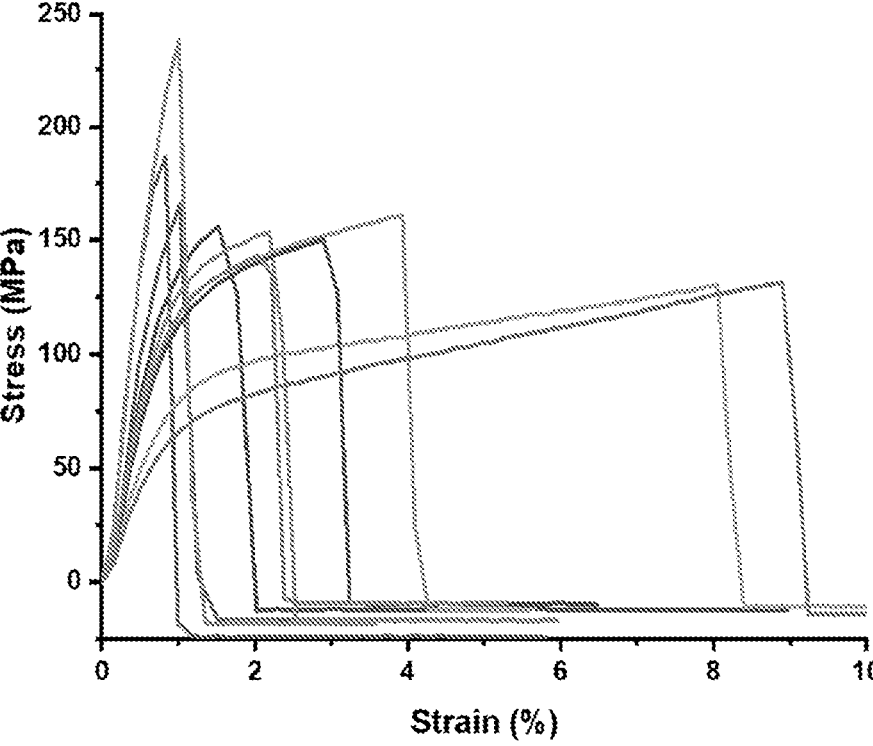
FIG. 5. Polymer/polymeric BN precursor/BNNT precursor fiber stress-strain curves.

*shrinkage during heat treatment shown in FIG. 4 and FIG. 5. The results in FIG. 4 indicate the precursor fiber has a tensile strength of 265 MPa and a modulus of 9.4 GPa. The results in FIG. 5 indicate that the precursor fiber has a tensile strength of 162 MPa and a modulus of 14.3 GPa.

The methods further comprise heat treatment of polymer/polymeric BN precursor/BNNT precursor fibers to form the BN/BNNT fibers. Conditions that can be used include:

Example 4-Hybrid Boron Nitride (BN)/Boron Nitride Nanotube (BNNT) Fibers

Disclosed herein are composite fibers and methods of making and use thereof.

The methods can, for example, comprise spinning of polymer/preceramic/BNNT precursor followed by heat treatment of the precursor fiber to form the BN/BNNT fiber. The BN/BNNT fiber morphology and structure have been investigated, and process has been made towards high-performance BN/BNNT fibers.

This work to-date has resulted in BN/BNNT fiber that has an average modulus as high as 145 GPa (with a high value of 159 GPa) and an average tensile strength as high as 340 MPa (with a high value of 536 MPa). Further processing optimization and by increasing the heat-treatment temperature to 1500 to 2200° C. or higher can increase properties beyond what has been achieved so far.

Fiber spinning: Precursor polymer/polymeric BN precursor/BNNT fibers were spun from a polymer, polymeric BN precursor, BNNT dispersion. The polymer/polymeric BN precursor/BNNT precursor fiber contained between 1 and 50 wt % polymeric BN precursor and between 1 and 50 wt % BNNT, with respect to the total weight of the polymer.

First, mechanical stirring was used to disperse the polymeric BN precursor in a solvent (e.g., dimethylacetamide, DMAc) with a concentration of between 1 and 10 g polymeric BN precursor/100 mL. This dispersion was then added to a polymer slurry at room temperature.

Second, a dispersion of BNNT in a solvent (e.g., DMAc) with a concentration of between .01 and .5 g BNNT/100 mL was sonicated using a bath sonicator. The dispersion can then be added to a reactor with the polymer/polymeric BN precursor dispersion while stirring at a temperature of less than 20° C.

After 1 hr stirring the temperature is increased to >50° C. and subsequently decreased for excess solvent evaporation.

Once the solution reaches a suitable viscosity and fiber-forming tendency, fibers are spun into a coagulation bath (e.g., toluene or toluene/DMAc with a DMAc vol % of from 1-30%). This setup allowed for continuous dry-jet wet spinning, using a spinneret with diameter of less than 500 μm.

Fiber Drawing: Fiber drawing was conducted in an inert environment at a temperature greater than 100° C. Room temperature drawing before hot drawing can also be performed.

Conversion to BN/BNNT hybrid fiber: The polymer/polymeric BN precursor/BNNT precursor fiber underwent a multistep heat-treatment to remove the polymer, to further align BNNTs, and to convert the polymeric BN precursor to BN. This was done in a tube furnace under ammonia and nitrogen, while maintaining tension. Tension during heat-treatment was between 0 to 100 MPa, based on the final BN/BNNT hybrid fiber diameter, number of filaments, and the hanging weight.

Further BN/BNNT hybrid fiber heat treatment: The BN/BNNT fiber can be further heat treated to 1500 and then to 2200° C. in an inert environment to further improve properties.

Example 5-Hybrid Boron Nitride (BN)/Boron Nitride Nanotube (BNNT) Fibers

Disclosed herein are composite fibers and methods of making and use thereof.

The methods comprise forming a dispersion comprising BNNTs, a polymer, a polymeric BN precursor, and a solvent, followed by spinning and drawing.

A photograph of a drawn precursor fiber containing polymer/preceramic/BNNT is shown in FIG. 1. SEM images of tensile fracture of polymer/preceramic/BNNT precursor drawn fibers at two different magnifications are shown in FIG. 2 and FIG. 3.

Tensile tests were performed on the precursor fibers. Tensile tests were performed on a TA instruments Rheometric Solids Analyzer, RSAIII using a strain rate of 1%/see for precursor fiber (6, 12, 25 mm gauge length) and 0.1%/see for BN/BNNT fibers (6, 12, 25 mm gauge length). Tensile strength is calculated as the maximum stress before fiber breakage and tensile modulus is calculated from the slope of the stress-strain curve.

The results for two different precursor fibers having two different polymeric BN precursor/BNNT weight ratios are shown in FIG. 4 and FIG. 5. The results in FIG. 4 indicate the precursor fiber has a tensile strength of 265 MPa and a modulus of 9.4 GPa. The results in FIG. 5 indicate that the precursor fiber has a tensile strength of 162 MPa and a modulus of 14.3 GPa.

The methods further comprise heat treatment of polymer/preceramic/BNNT precursor fibers to form the BN/BNNT fibers. Conditions that can be used include:

Ammonia and nitrogen environments.

Inert gases such as He and Ar can be used in some heat-treatment steps.

Temperatures from room temperature to 1000, to 1100, and to 1500° C.

Higher temperatures 1800 to 2000° C. can be used.

Heating rates between 0.5-3.0° C./min

Tension created stress between 0 to 50 MPa

Stress is calculated from the precursor fiber diameter, number of filaments, and the hanging weight Photographs of BN/BNNT fibers at two different BN precursor/BNNT weight ratios are shown in FIG. 6 and FIG. 7.

Figure 13:
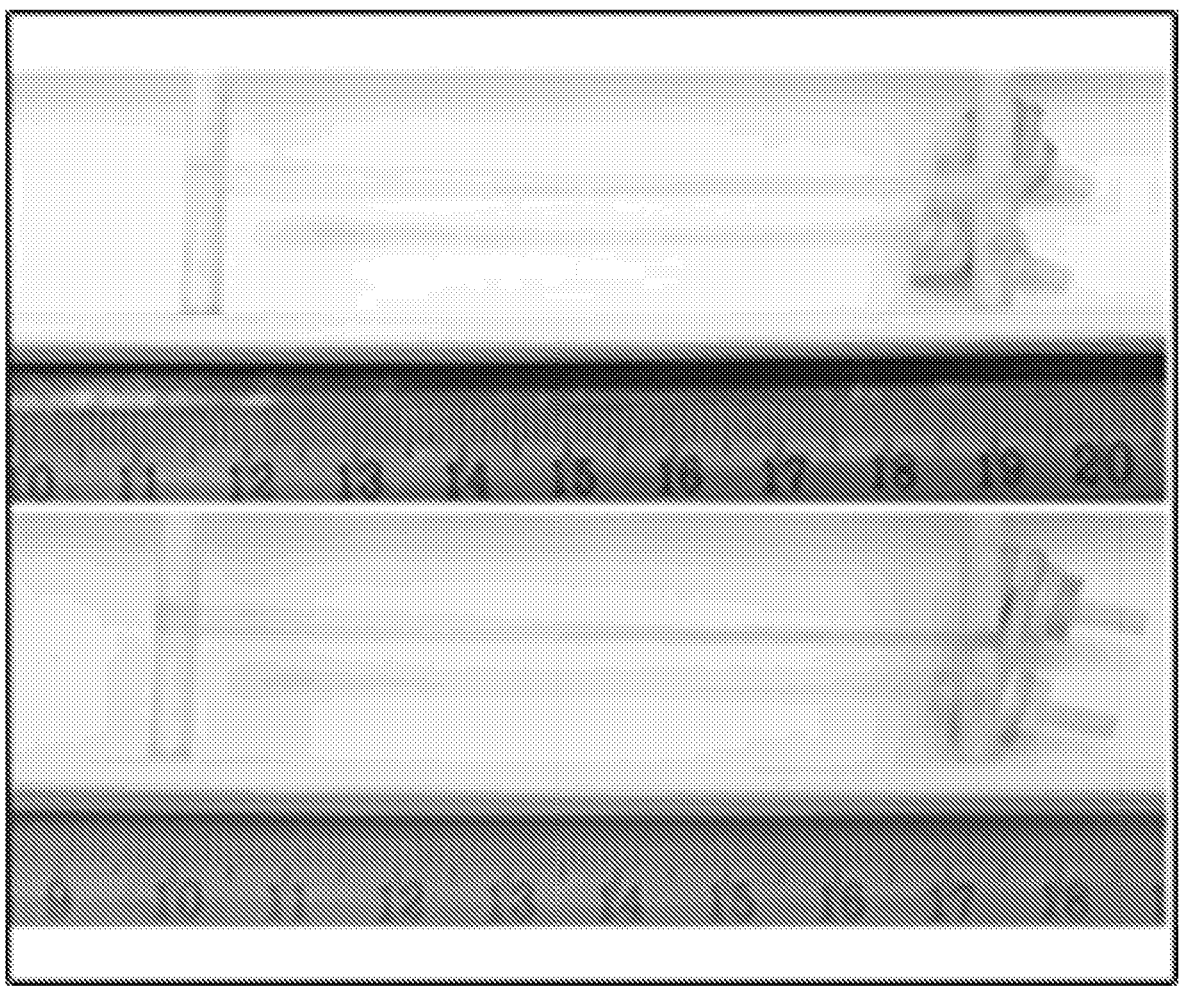
FIG. 13. Photograph of BN/BNNT fiber bundle before and after heat treatment.

Photographs of fibers before (top) and after (bottom) heat treatment to 1100° C. are shown in FIG. 13. Fiber length is about 7-8 cm.

Polymer/preceramic/BNNT precursor fiber can also have a pre-treatment stabilization step before heat-treatment to convert to BN/BNNT fiber. Conditions that can be used include:

Treatment to 200-400° C. in an inert environment.

Tensions can be from 0-50 Mpa during this treatment.

Stress is calculated from the precursor fiber diameter, number of filaments, and the hanging weight After this stabilization burnout can be done as previously described.

Figure 14:
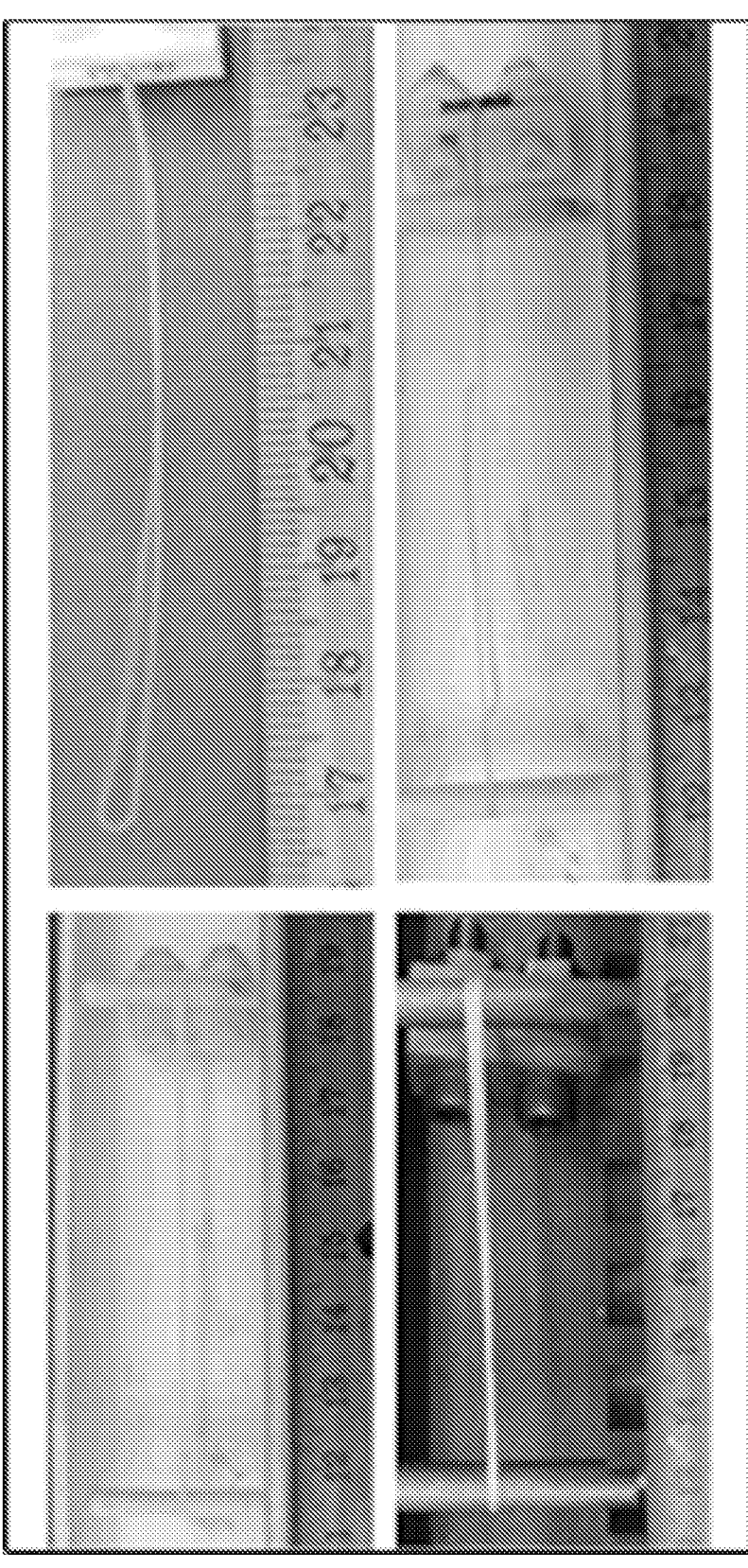
FIG. 14. Photograph of BN/BNNT fiber bundle at various stages of a multi-step heat treatment process.

Photographs of two different fibers (top and bottom) before (left) and after (right) heat treatment to 1100° C. are shown in FIG. 14. Fiber length is about 7 cm.

The morphology of the BN/BNNT fibers were characterized using electron microscopy. Images of BN/BNNT fibers from two different polymeric BN precursor/BNNT weight ratios after treatment at 1100° C. are shown in FIG. 8 and FIG. 9. Images of BN/BNNT fibers from two different polymeric BN precursor/BNNT weight ratios after treatment at 1500° C. are shown in FIG. 10 and FIG. 11. The images show the hybrid nature of the fibers, as BNNT fibrils can be seen protruding from the main BN matrix of the fibers.

Figure 15:
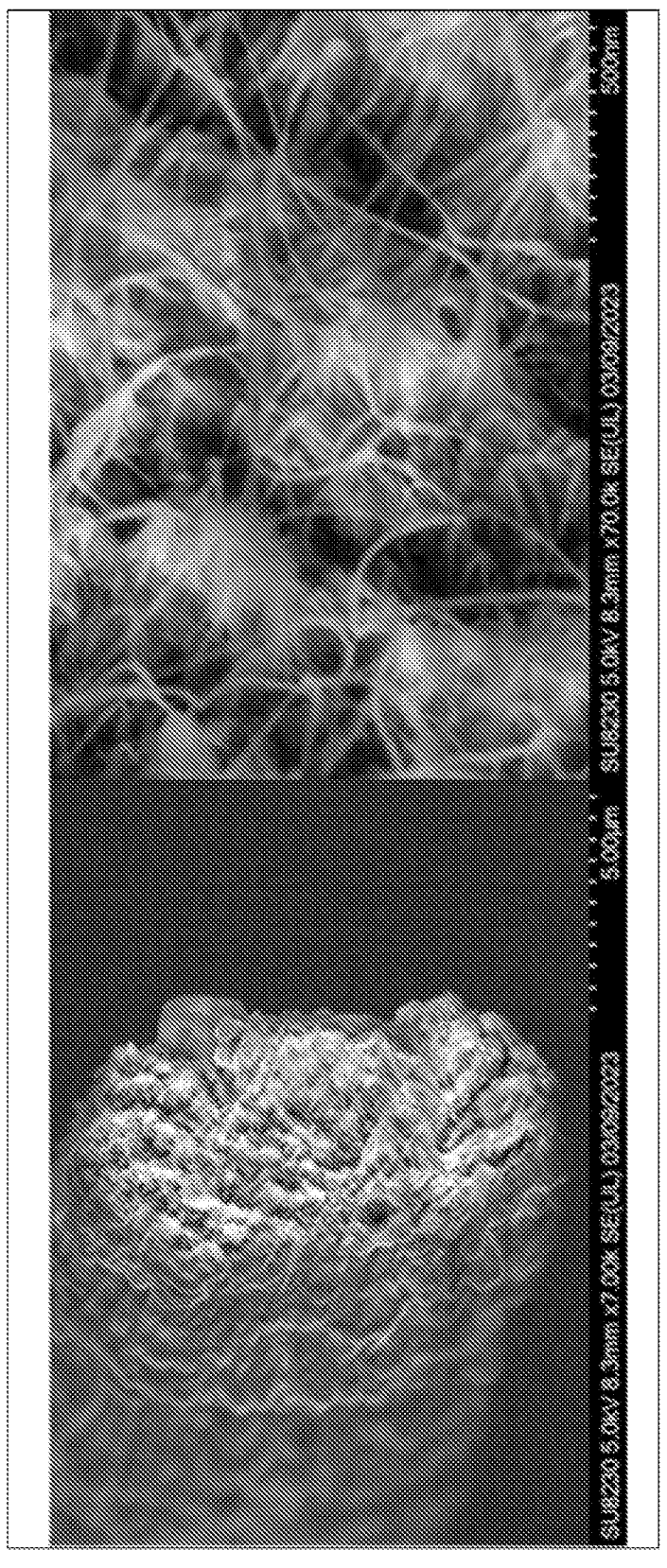
FIG. 15. SEM image of BN/BNNT fiber after heat treatment at 1100° C.

SEM images of an example BN/BNNT fiber cross sections (left) and magnified image (right) are shown in FIG. 15.

Figure 16:
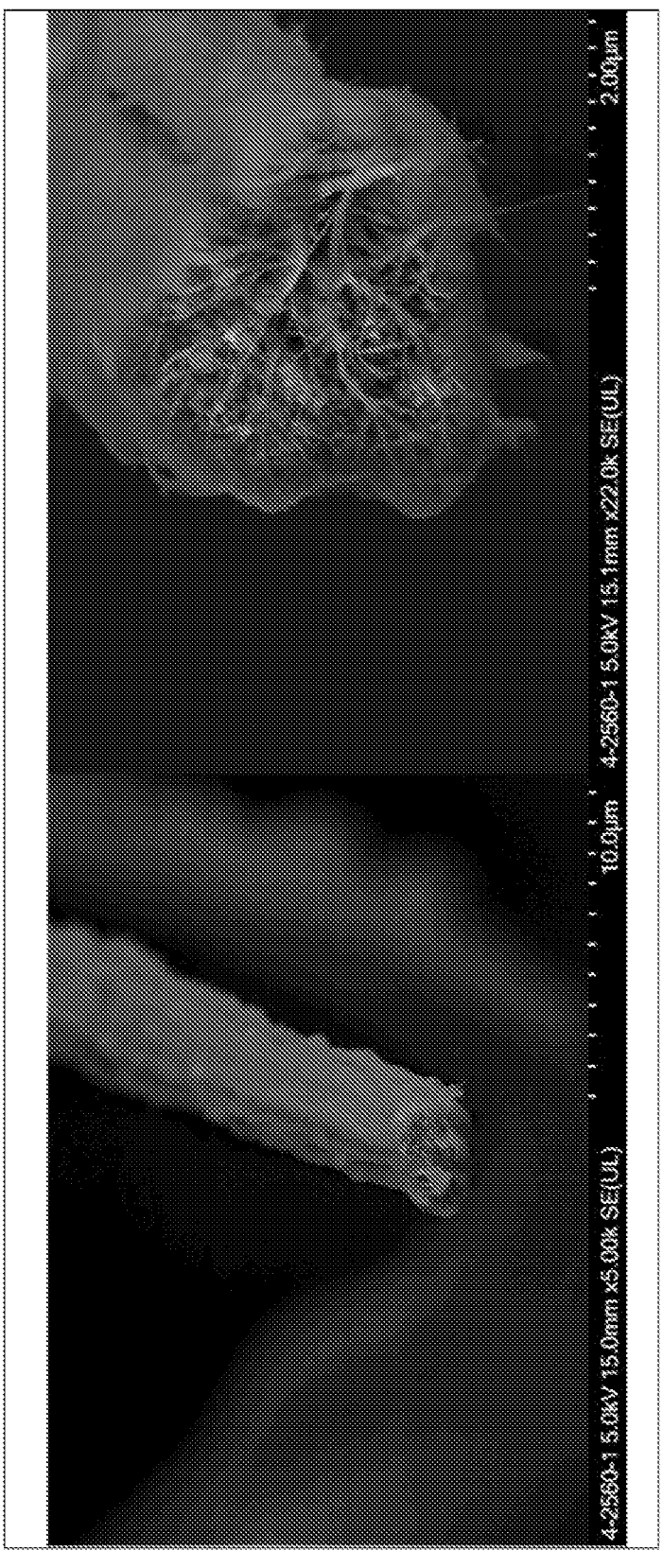
FIG. 16. SEM image of BN/BNNT fiber after heat treatment at 1100° C.

SEM images of an example BN/BNNT fiber surface (left) and cross section (right) are shown in FIG. 16.

The BN/BNNT fiber structure was characterized. WAXD plate images (left) and integrated scans (right) of BN/BNNT fibers with two different polymeric BN precursor/BNNT weight ratios are shown in FIG. 12. The arc from the images indicates BN orientation and integrated scans show characteristic BN peaks at 26° and 42°.

Figure 17:
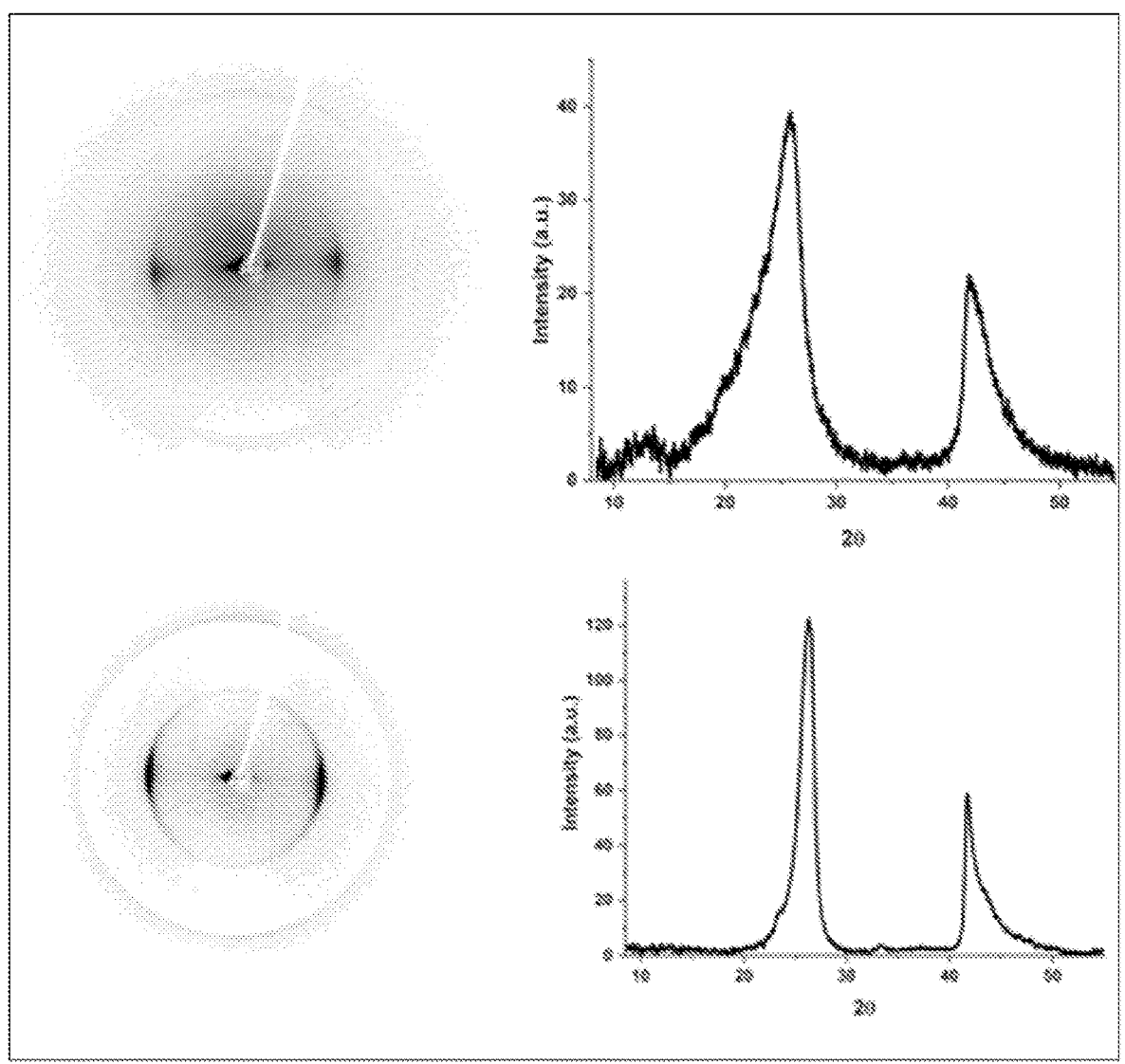
FIG. 17. WAXD flat plate images (left) and integrated scans (right) of BN/BNNT fibers after heat treatment to different temperatures.

WAXD flat plate photograph (left) and integrated scan (right) of fibers treated to 1100° C. (top) and fibers treated to 1750° C. (bottom) are shown in FIG. 17. The flat plate photograph shows BNNT (200) orientation, and the integrated scan shows BN/BNNT (200), (100), and (101) peaks. The decreased FWHM for the integrated scan of fibers treated to 1750° C. indicates an increase in crystal size.

Figure 18:
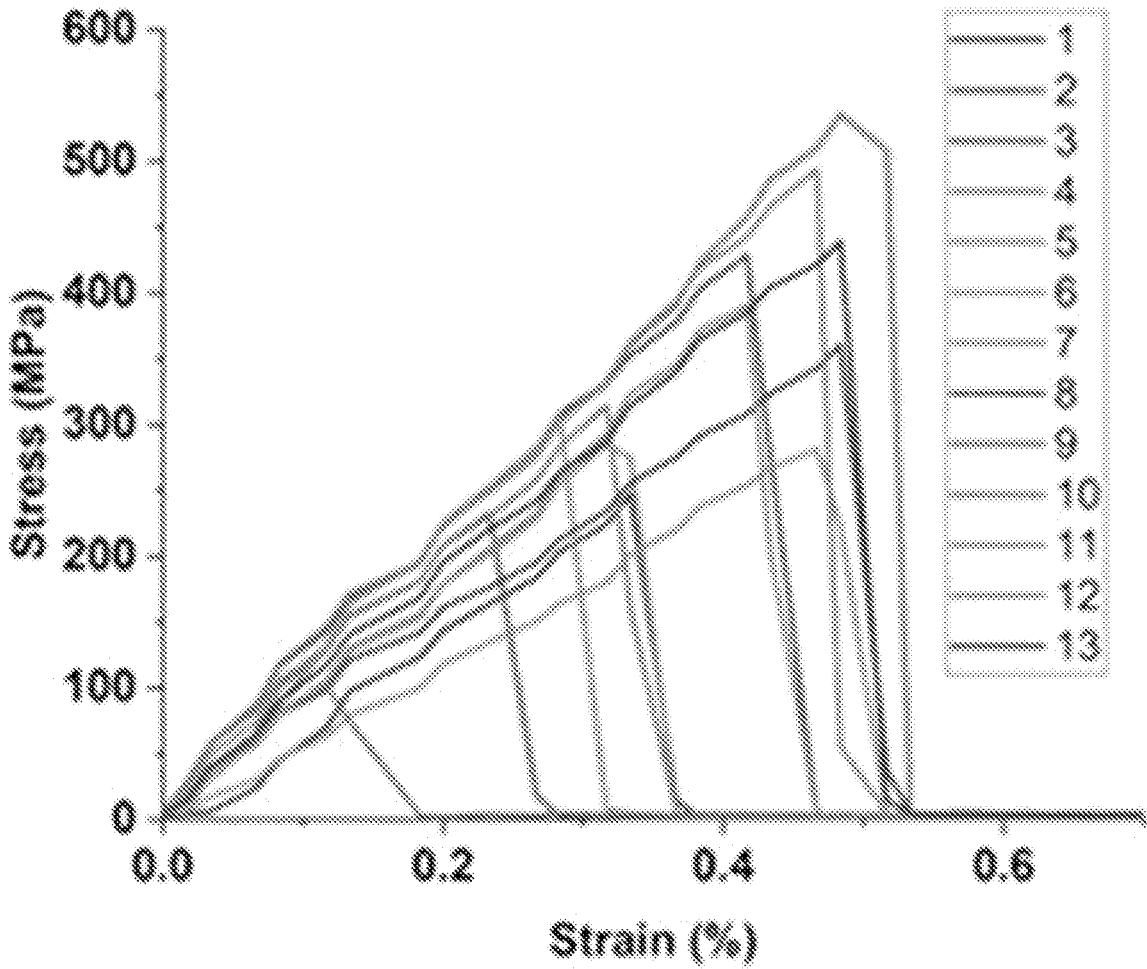
FIG. 18. BN/BNNT fiber stress-strain curves.
Figure 19:
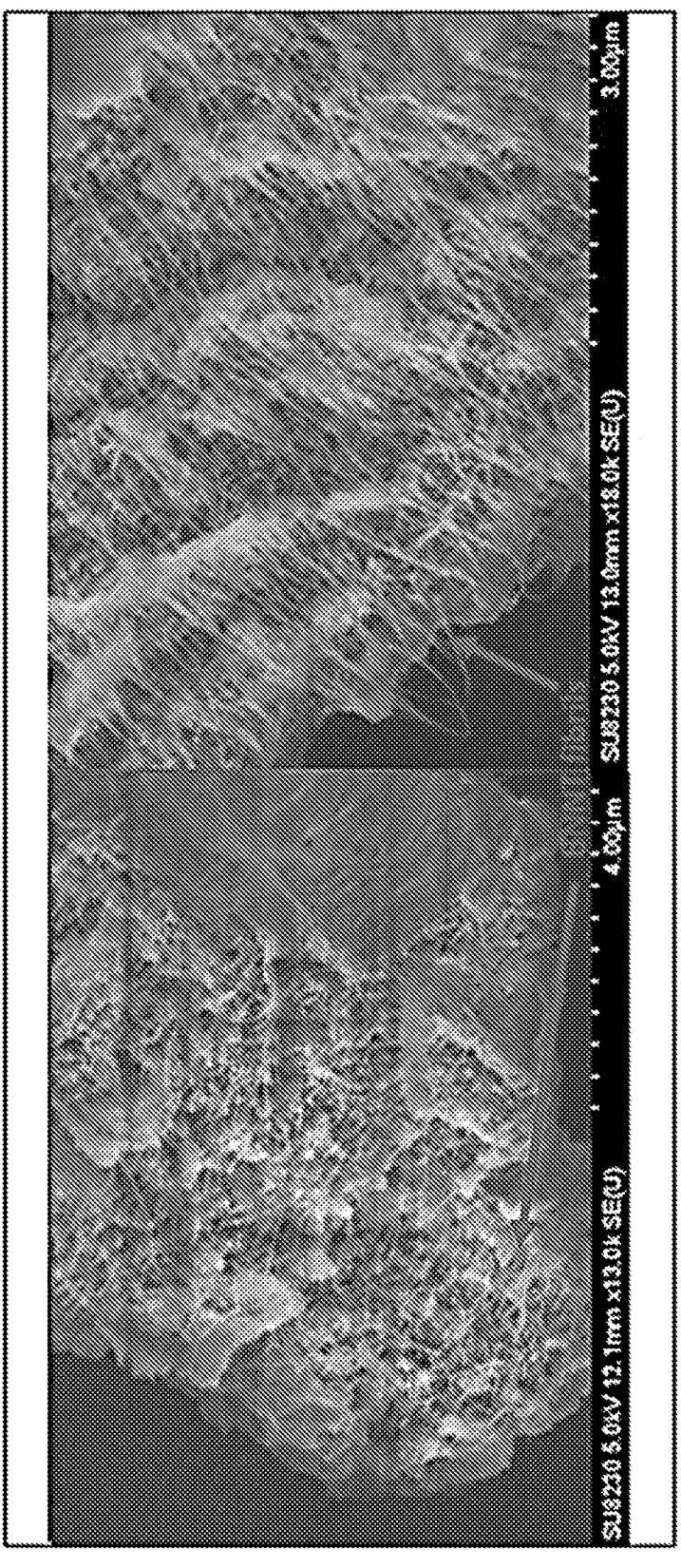
FIG. 19. SEM image of highest strength BN/BNNT fiber after heat treatment at 1100° C.

BN/BNNT fiber mechanical properties were further assessed. FIG. 18 shows stress-strain curves of BNNT fibers from a trial. SEMs of BN/BNNT fiber cross section (left) and magnified image (right) are shown in FIG. 19.

The results shown herein indicate that the methods herein have provided progress towards high-performance BN/BNNT fibers.

Hybrid BN/BNNT fibers with 2.5-10 μm diameter have been processed. These fibers show some BN orientation (determined from WAXD). Tensile strength exceeding 340 MPa (high of 536 MPa) and tensile modulus exceeding 145 GPa (with a high value of 159 GPa).

A summary of BN/BNNT properties made by the methods herein is provided in Table 2.

This work to-date has resulted in BN/BNNT fiber that has an average modulus as high as 146 GPa (with a high value of 159 GPa) and an average tensile strength as high as 340 MPa (with a high value of 536 MPa). Further processing optimization and by increasing the heat-treatment temperature to 1500 to 2000° C. or higher can increase properties beyond what has been achieved so far. The BN/BNNT fiber can be further heat treated to 1500 and then to 2000° C. in an inert environment to further improve properties.

Example 1: A method of making a boron nitride/boron nitride nanotube composite fiber (e.g., a composite fiber comprising boron nitride and boron nitride nanotubes), the method comprising: spinning a mixture comprising a plurality of boron nitride nanotubes, a polymeric boron nitride precursor, a polymer, and a solvent to form precursor fibers comprising the plurality of boron nitride nanotubes, the polymeric boron nitride precursor, and the polymer, wherein the precursor fibers have a first average outer diameter; drawing the precursor fibers to form drawn fibers, wherein the drawn fibers have a second average outer diameter, the second average outer diameter being less than the first average outer diameter; and heating the drawn fibers while the drawn fibers are under tension to substantially remove the polymer and to substantially convert the polymeric boron nitride precursor to boron nitride, thereby forming the composite fiber.

Example 2: The method of any examples herein, particularly example 1, further comprising forming the mixture by: forming a first dispersion by dispersing the plurality of boron nitride nanotubes in a first solvent; forming a second dispersion by dispersing the polymeric boron nitride precursor in a second solvent; contacting the second dispersion with the polymer to form a third dispersion; and contacting the first dispersion with the third dispersion.

TABLE 2

Hybrid BN/BNNT fiber properties.

| Sample ID | Elemental Composition | Shrink-age (%)* | Equivalent fiber diameter (μm) | Average tensile strength (MPa) [max] | Average Young's modulus (GPa) [max] |
|---|---|---|---|---|---|
| P9A3 | $B_{0.95}N_{1.00}C_{0.13}O_{0.08}$ | −5 | 4.4 ± 0.4 | 105 ± 39 [152] | 44 ± 16 [73] |
| P10A7 | $B_{0.96}N_{1.00}C_{0.15}O_{0.06}$ | −7 | 6.6 ± 0.8 | 93 ± 28 [136] | 35 ± 15 [57] |
| P9N3 | $B_{0.95}N_{1.00}C_{0.13}O_{0.06}$ | 0 | 4.5 ± 0.5 | 95 ± 36 [159] | 44 ± 13 [63] |
| P10N7 | $B_{1.00}N_{1.00}C_{0.16}O_{0.06}$ | 0 | 6.6 ± 0.8 | 142 ± 89 [327] | 55 ± 31 [121] |
| P11A4 | $B_{0.90}N_{1.00}C_{0.10}O_{0.06}$ | 1 | 9.8 ± 1.1 | 340 ± 114 [536] | 99 ± 17 [137] |
| P11A18 | $B_{0.91}N_{1.00}C_{0.20}O_{0.05}$ | 0 | 8.8 ± 1.8 | 247 ± 57 [336] | 146 ± 9 [159] |
| P9A17 | $B_{0.85}N_{1.00}C_{0.24}O_{0.08}$ | 3 | 26. ± 0.3 | 265 ± 89 [408] | 125 ± 28 [147] |

*shrinkage during heat treatment

Figure 20:
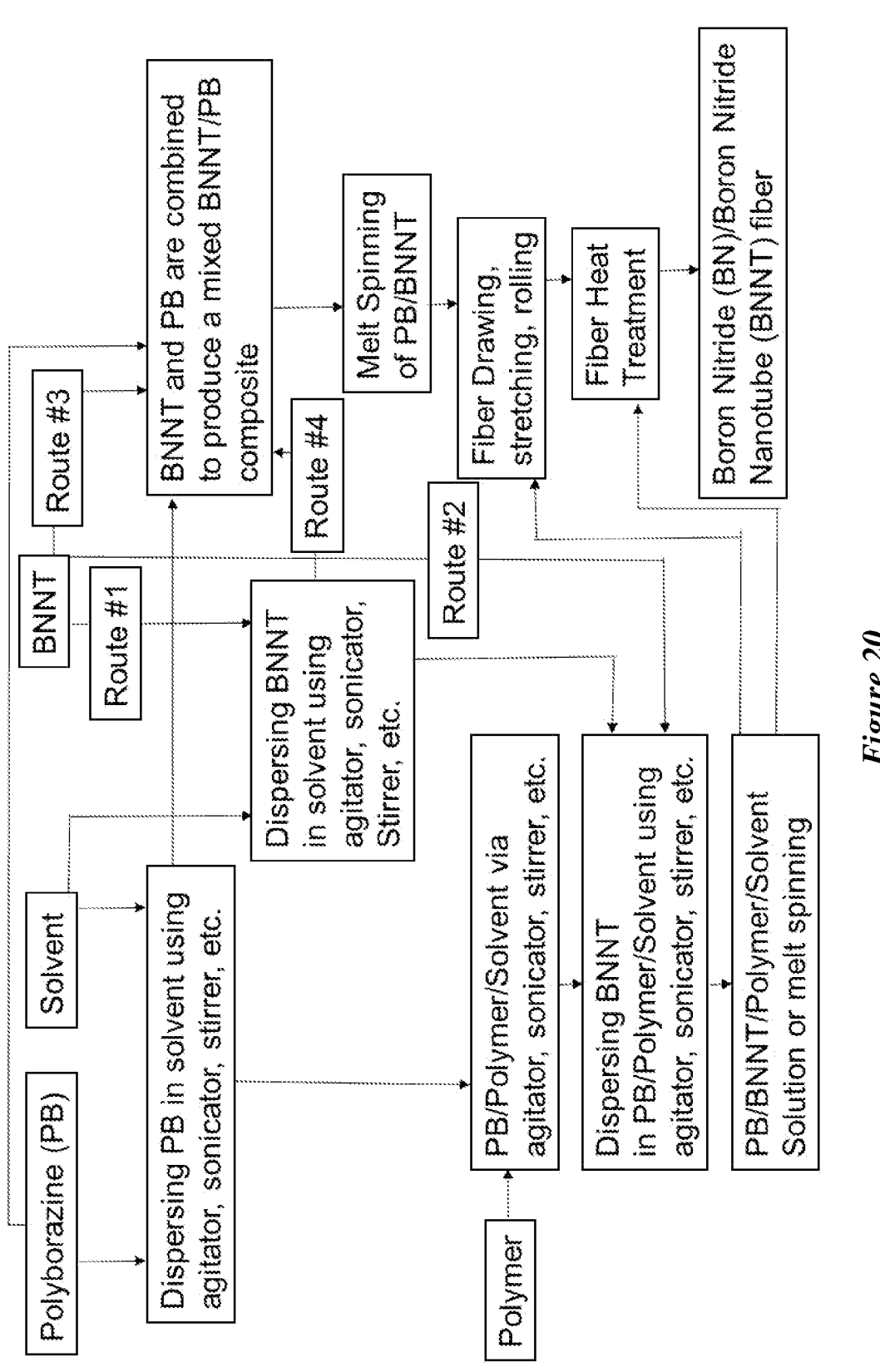
FIG. 20. Schematic diagram of the process overview.

A schematic diagram of the process overview is shown in FIG. 20. Processing steps can be optimized for different routes. The process generally comprises:
1. PB, BNNTs, polymer, and/or solvent are combined into spinning dispersion;
2. Multicomponent fibers are spun;
3. Multicomponent fibers are drawn; and
4. Multicomponent fibers are heat treated to convert BN and/or remove polymer and yield BN/BNNT fibers.

Exemplary Aspects

In view of the described boron nitride/boron nitride nanotube composite fibers and methods of making and use thereof, herein below are described certain more particularly described aspects of the inventions. The particularly recited aspects should not, however, be interpreted to have any limiting effect on any different claims containing different or more general teachings described herein or that the "particular" aspects are somehow limited in some way other than the inherent meanings of the language and formulas literally used therein.

Example 3: The method of any examples herein, particularly example 2, wherein the first dispersion comprises the plurality of boron nitride nanotubes at a concentration of from 0.01 grams to 5 grams boron nitride nanotubes per 100 milliliters of solvent.

Example 4: The method of any examples herein, particularly example 2 or example 3, further comprising agitating the first dispersion before contacting the first dispersion with the third dispersion.

Example 5: The method of any examples herein, particularly examples 2-4, wherein the second dispersion comprises the polymeric boron nitride precursor at a concentration of from 0.1 grams to 25 grams of polymeric boron nitride precursor per 100 milliliters of solvent.

Example 6: The method of any examples herein, particularly examples 2-5, further comprising agitating the second dispersion before contacting the second dispersion with the polymer.

Example 7: The method of any examples herein, particularly examples 2-6, wherein the first solvent and the second solvent are the same.

Example 8: The method of any examples herein, particularly examples 1-7, wherein the polymer comprises a polyacrylonitrile (co) polymer, a poly(methyl (meth) acrylate) (co) polymer, a polyvinyl alcohol (co) polymer, or a combination thereof.

Example 9: The method of any examples herein, particularly examples 1-8, further comprising agitating the mixture before spinning the mixture.

Example 10: The method of any examples herein, particularly example 9, wherein the mixture is agitated for a first amount of time at a first temperature, the first amount of time being from 1 minute to 72 hours and/or the first temperature being 30° C. or less.

Example 11: The method of any examples herein, particularly example 10, wherein, after the first amount of time, the method further comprises heating the mixture at a second temperature for a second amount of time, the second temperature being 50° C. or more and/or the second amount of time being from 1 second to 72 hours.

Example 12: The method of any examples herein, particularly example 11, wherein the method further comprises ceasing agitation for at least a portion of the second amount of time.

Example 13: The method of any examples herein, particularly examples 1-12, wherein the plurality of boron nitride nanotubes has an average outer diameter of from 1 nanometer (nm) to 100 nm.

Example 14: The method of any examples herein, particularly examples 1-13, wherein the plurality of boron nitride nanotubes has an average length of from 100 nm to 10 millimeters (mm).

Example 15: The method of any examples herein, particularly examples 1-14, wherein the plurality of boron nitride nanotubes has an average aspect ratio of from greater than 1 to $1 \times 10^7$.

Example 16: The method of any examples herein, particularly examples 1-15, wherein the polymeric boron nitride precursor comprises a borazine compound, such as a borazine-based compound.

Example 17: The method of any examples herein, particularly examples 1-16, wherein spinning the mixture comprises electrospinning, wet jet fiber pulling, wet spinning, dry spinning, dry-jet wet spinning, or combinations thereof.

Example 18: The method of any examples herein, particularly examples 1-17, wherein spinning the mixture comprises dry-jet wet spinning.

Example 19: The method of any examples herein, particularly examples 1-18, wherein the precursor fibers are spun into a coagulation bath, the coagulation bath comprising a coagulation solvent.

Example 20: The method of any examples herein, particularly example 19, wherein the coagulation solvent comprises methanol.

Example 21: The method of any examples herein, particularly example 19, wherein the coagulation solvent comprises toluene, dimethylacetamide (DMAc), or a combination thereof. Example 22: The method of any examples herein, particularly examples 1-21, wherein the mixture is spun using a spinneret having a diameter of 500 μm or less.

Example 23: The method of any examples herein, particularly examples 1-22, wherein the first average outer diameter of the precursor fiber is from 100 nm to 500 μm.

Example 24: The method of any examples herein, particularly examples 1-23, wherein the precursor fiber comprises from 1 to 50 wt. % of the plurality of boron nitride nanotubes relative to the total weight of the polymer.

Example 25: The method of any examples herein, particularly examples 1-24, wherein the precursor fiber comprises from 1 to 80 wt. % of the polymeric boron nitride precursor relative to the total weight of the polymer.

Example 26: The method of any examples herein, particularly examples 1-25, wherein the precursor fibers are drawn in an inert environment.

Example 27: The method of any examples herein, particularly examples 1-26, wherein the precursor fibers are drawn at a temperature of 20° C. or more.

Example 28: The method of any examples herein, particularly examples 1-27, wherein the precursor fibers are drawn at a temperature of 100° C. or more.

Example 29: The method of any examples herein, particularly examples 1-28, wherein the second average outer diameter of the drawn fiber is from 100 nm to 100 μm.

Example 30: The method of any examples herein, particularly examples 1-29, wherein the drawn fibers are heated in a tube or box furnace.

Example 31: The method of any examples herein, particularly examples 1-30, wherein the drawn fibers are heated in an atmosphere comprising nitrogen, ammonia, helium, argon, or a combination thereof.

Example 32: The method of any examples herein, particularly examples 1-31, wherein the tension applied to the drawn fibers during heating is from greater than 0 to 100 MPa.

Example 33: The method of any examples herein, particularly examples 1-32, wherein the tension applied to the drawn fibers during heating is from greater than 0 MPa to 50 MPa.

Example 34: The method of any examples herein, particularly examples 1-33, wherein the drawn fibers are heated at a temperature from 20° C. to 1500° C.

Example 35: The method of any examples herein, particularly examples 1-34, wherein the drawn fibers are heated at a temperature of from 20° C. to 1000° C., from 20° C. to 1100° C., or from 100° C. to 1100° C.

Example 36: The method of any examples herein, particularly examples 1-35, wherein the drawn fibers are heated at a heating rate of from 0.1° C./minute to 3.0° C./minute.

Example 37: The method of any examples herein, particularly examples 1-36, wherein the composite fiber has an average outer diameter of from 100 nm to 50 μm.

Example 38: The method of any examples herein, particularly examples 1-37, wherein the composite fiber has a modulus of from 5 GPa to 500 GPa.

Example 39: The method of any examples herein, particularly examples 1-38, wherein the composite fiber has a modulus of 5 GPa or more, 50 GPa or more, or 100 GPa or more.

Example 40: The method of any examples herein, particularly examples 1-39, wherein the composite fiber has a tensile strength of from 25 MPa to 5 GPa.

Example 41: The method of any examples herein, particularly examples 1-40, wherein the composite fiber has a tensile strength of 25 MPa or more, 50 MPa or more, 100 MPa or more, 200 MPa or more, or 330 MPa or more.

Example 42: The method of any examples herein, particularly examples 1-41, wherein the composite fiber has a high thermal conductivity, high temperature oxidative resistance, low electrical conductivity, or a combination thereof.

Example 43: The method of any examples herein, particularly examples 1-42, further comprising heat treating the composite fiber.

Example 44: The method of any examples herein, particularly examples 1-43, wherein heat treating the composite fiber comprises heating the composite fiber at a temperature of from 1500° C. to 2200° C. or from 1800° C. to 2200° C. in an inert environment.

Example 45: The method of any examples herein, particularly examples 1-44, wherein heat treating the composite fiber comprises heating the composite fiber at a temperature of from 1500° C. to 2000° C. or from 1800° C. to 2000° C. in an inert environment.

Example 46: A composite fiber made by the method of any examples herein, particularly examples 1-45.

Other advantages which are obvious, and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods and compositions of the appended claims are not limited in scope by the specific methods and compositions described herein, which are intended as illustrations of a few aspects of the claims and any methods and compositions that are functionally equivalent are intended to fall within the scope of the claims. Various modifications of the methods and compositions in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method of making a boron nitride/boron nitride nanotube composite fiber, the method comprising:
    forming a mixture comprising a plurality of boron nitride nanotubes, a polymeric boron nitride precursor, a polymer, and a solvent, wherein the mixture is formed by:
        forming a first dispersion by dispersing the plurality of boron nitride nanotubes in a first solvent;
        forming a second dispersion by dispersing the polymeric boron nitride precursor in a second solvent;
        contacting the second dispersion with the polymer to form a third dispersion; and
        contacting the first dispersion with the third dispersion;
    spinning the mixture to form precursor fibers comprising the plurality of boron nitride nanotubes, the polymeric boron nitride precursor, and the polymer, wherein the precursor fibers have a first average outer diameter;

wherein spinning the mixture comprises electrospinning, wet jet fiber pulling, wet spinning, dry spinning, dry-jet wet spinning, or combinations thereof;
    drawing the precursor fibers to form drawn fibers, wherein the drawn fibers have a second average outer diameter, the second average outer diameter being less than the first average outer diameter; and
    heating the drawn fibers while the drawn fibers are under tension to substantially remove the polymer and to substantially convert the polymeric boron nitride precursor to boron nitride, thereby forming the composite fiber.

2. The method of claim 1, wherein the first dispersion comprises the plurality of boron nitride nanotubes at a concentration of from 0.01 grams to 5 grams boron nitride nanotubes per 100 milliliters of solvent.

3. The method of claim 1, further comprising: agitating the first dispersion before contacting the first dispersion with the third dispersion; agitating the second dispersion before contacting the second dispersion with the polymer; or a combination thereof.

4. The method of claim 1, wherein the second dispersion comprises the polymeric boron nitride precursor at a concentration of from 0.1 grams to 25 grams of polymeric boron nitride precursor per 100 milliliters of solvent.

5. The method of claim 1, wherein the polymer comprises a polyacrylonitrile (co) polymer, a poly(methyl (meth) acrylate) (co) polymer, a polyvinyl alcohol (co) polymer, or a combination thereof.

6. The method of claim 1, further comprising agitating the mixture before spinning the mixture.

7. The method of claim 1, wherein the plurality of boron nitride nanotubes has an average outer diameter of from 1 nanometer (nm) to 100 nm, an average length of from 100 nm to 10 millimeters (mm), or a combination thereof.

8. The method of claim 1, wherein the polymeric boron nitride precursor comprises a borazine compound.

9. The method of claim 1, wherein spinning the mixture comprises dry spinning, dry-jet wet spinning.

10. The method of claim 1, wherein the first average outer diameter of the precursor fiber is from 100 nm to 500 μm.

11. The method of claim 1, wherein the precursor fiber comprises:
    from 1 to 50 wt. % of the plurality of boron nitride nanotubes relative to the total weight of the polymer;
    from 1 to 80 wt. % of the polymeric boron nitride precursor relative to the total weight of the polymer;
    or a combination thereof.

12. The method of claim 1, wherein the precursor fibers are drawn at a temperature of 100° C. or more.

13. The method of claim 1, wherein the second average outer diameter of the drawn fiber is from 100 nm to 100 μm.

14. The method of claim 1, wherein the tension applied to the drawn fibers during heating is from greater than 0 to 100 MPa.

15. The method of claim 1, wherein the drawn fibers are heated at a temperature from 20° C. to 1500° C.

16. The method of claim 1, wherein the composite fiber has an average outer diameter of from 100 nm to 50 μm.

17. The method of claim 1, wherein the composite fiber has a modulus of from 5 GPa to 500 GPa, a tensile strength of from 25 MPa to 5 GPa, or a combination thereof.

18. The method of claim 1, further comprising heat treating the composite fiber, wherein heat treating the composite fiber comprises heating the composite fiber at a temperature of from 1500° C. to 2200° C. in an inert environment.

19. The method of claim 1, wherein the polymer comprises a polyacrylonitrile and the polymeric boron nitride precursor comprises a borazine compound.

\* \* \* \* \*